US008725908B2

(12) United States Patent
Kitagawa

(10) Patent No.: US 8,725,908 B2
(45) Date of Patent: May 13, 2014

(54) INFORMATION PROCESSING APPARATUS, PERIPHERAL APPARATUS CONTROL METHOD, AND STORAGE MEDIUM

(75) Inventor: Kan Kitagawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/238,651

(22) Filed: Sep. 21, 2011

(65) Prior Publication Data
US 2012/0084468 A1 Apr. 5, 2012

(30) Foreign Application Priority Data
Sep. 30, 2010 (JP) ................................. 2010-221799

(51) Int. Cl.
G06F 3/00 (2006.01)
G06F 15/00 (2006.01)

(52) U.S. Cl.
USPC ............................... 710/15; 358/1.9; 715/700

(58) Field of Classification Search
USPC .................. 710/15–19; 715/700; 358/1.1, 1.9
See application file for complete search history.

(56) References Cited

U.S. PATENT DOCUMENTS

| 7,437,022 | B2 * | 10/2008 | Uchida et al. | 382/305 |
| 7,916,332 | B2 * | 3/2011 | Kato | 358/1.15 |
| 2006/0238786 | A1 * | 10/2006 | Sakura et al. | 358/1.9 |
| 2007/0024896 | A1 * | 2/2007 | Bounar | 358/1.15 |
| 2008/0024802 | A1 * | 1/2008 | Kato | 358/1.9 |
| 2009/0133015 | A1 * | 5/2009 | Nagashima | 717/176 |
| 2010/0211873 | A1 * | 8/2010 | Horikoshi | 715/705 |
| 2010/0272486 | A1 * | 10/2010 | Oeters et al. | 399/382 |
| 2012/0218602 | A1 * | 8/2012 | Sakura et al. | 358/1.15 |

FOREIGN PATENT DOCUMENTS

| JP | 2005-085132 A | 3/2005 |
| JP | 2010-205285 A | 9/2010 |

* cited by examiner

Primary Examiner — Christopher Shin
(74) Attorney, Agent, or Firm — Canon U.S.A., Inc. IP Division

(57) ABSTRACT

A peripheral apparatus control system that provides a device management screen capable of producing appropriate view contents and functions according to the use environment of each user for improving operability. The system includes an information processing apparatus, a peripheral apparatus, a driver capable of controlling the peripheral apparatus, a peripheral apparatus management function capable of managing the peripheral apparatus, and a peripheral apparatus management screen. The system determines a view content of the peripheral apparatus management screen according to an attribute of the driver.

17 Claims, 17 Drawing Sheets

←—→ ADDRESS BUS AND DATA BUS

FIG. 8

```xml
<?xml version="1.0" encoding="utf-8"?>
<dm:deviceManagement xmlns:dm="http://abc.xxx/dm/control">
    <dm:manufacturer>ABC</dm:manufacturer> ~ 801
    <dm:model>Kmmn</dm:model> ~ 802
    <dm:functions> ~ 803
        <dm:function> ~ 804
            <dm:name xml:lang="en-US">Printer Preferences</dm:name> ~ 805
            <dm:required> ~ 806
                <dm:device>printer</dm:device> ~ 807
                <dm:attributeFAX>false</dm:attributeFAX> ~ 808
            </dm:required>
            <dm:execute> openPrinterPreferences</dm:execute> ~ 809
        </dm:function>
        <dm:function> ~ 810
            <dm:name xml:lang="en-US">FAX Preferences</dm:name> ~ 811
            <dm:required> ~ 812
                <dm:device>printer</dm:device> ~ 813
                <dm:attributeFAX>true</dm:attributeFAX> ~ 814
            </dm:required>
            <dm:execute> openFAXPreferences</dm:execute> ~ 815
        </dm:function>
        <dm:function> ~ 816
            <dm:name xml:lang="en-US">Printer/FAX Preferences</dm:name> ~ 817
            <dm:required> ~ 818
                <dm:device>printer</dm:device> ~ 819
                <dm:attributeFAX invert="true" /> ~ 820
            </dm:required>
            <dm:execute> openPrinetrerFAXPreferences</dm:execute> ~ 821
        </dm:function>
    </dm:functions>
</dm:deviceManagement>
```

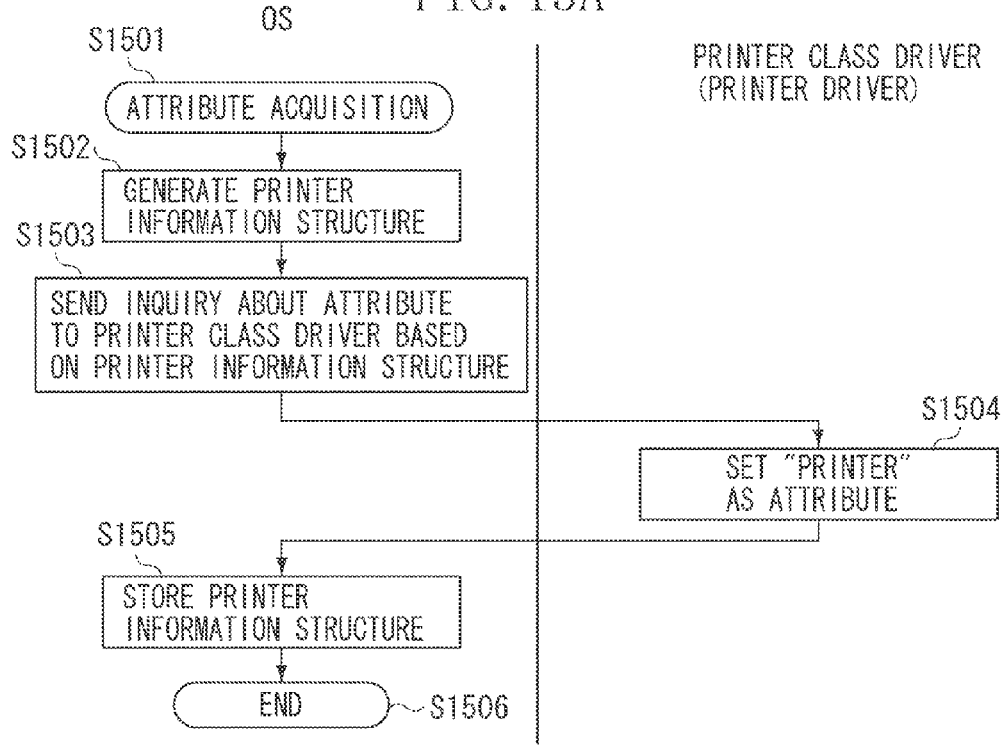
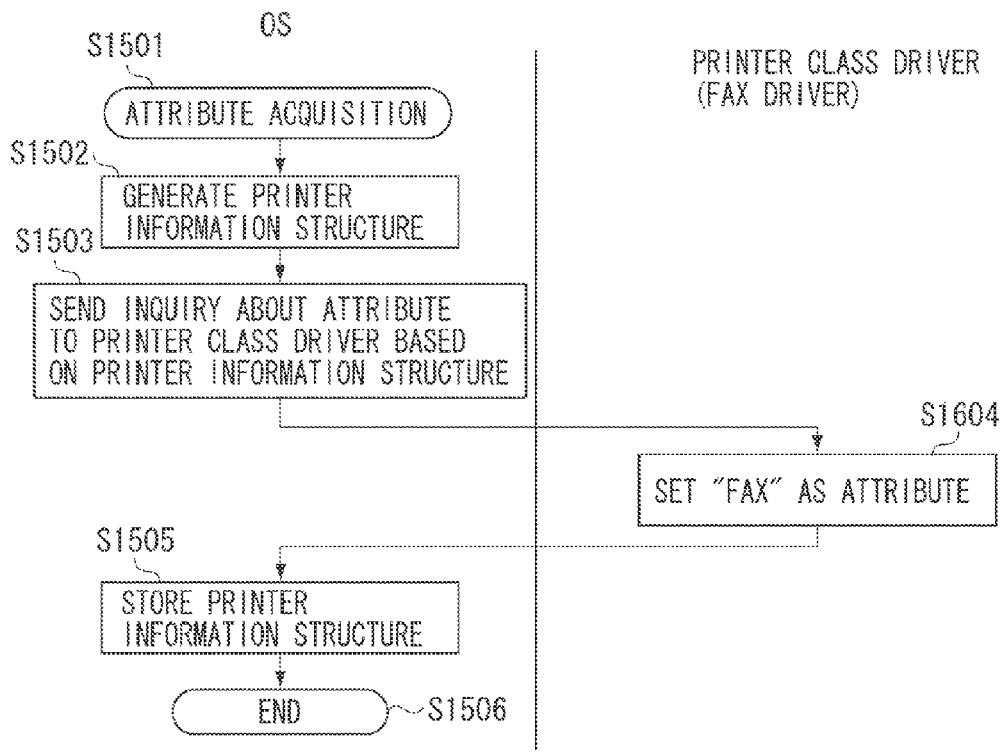

FIG. 15

```
                     1000
typedef struct_PRINTER_INFO_2 {
    LPTSTR                  pServerName;
    LPTSTR                  pPrinterName;
    LPTSTR                  pShareName;
    LPTSTR                  pPortName;
    LPTSTR                  pDriverName;
    LPTSTR                  pComment;
    LPTSTR                  pLocation;
    LPDEVMODE               pDevMode;
    LPTSTR                  pSepFile;
    LPTSTR                  pPrintProcessor;
    LPTSTR                  pDatatype;
    LPTSTR                  pParameters;
    PSECURITY_DESCRIPTOR    pSecurityDescriptor;
    DWORD                   Attributes;  ~1001
    DWORD                   Priority;
    DWORD                   DefaultPriority;
    DWORD                   StartTime;
    DWORD                   UntilTime;
    DWORD                   Status;
    DWORD                   cJobs;
    DWORD                   AveragePPM;
} PRINTER_INFO_2,*PRINTER_INFO_2;
```

INFORMATION PROCESSING APPARATUS, PERIPHERAL APPARATUS CONTROL METHOD, AND STORAGE MEDIUM

BACKGROUND OF THE INVENTION

1. Field of the Invention

The present invention relates to an information processing apparatus, a peripheral apparatus control method, and a related program.

2. Description of the Related Art

A peripheral apparatus control system enables a user of an information processing apparatus to access a peripheral apparatus via an appropriate interface, such as Universal Serial Bus (USB), Ethernet®, or wireless LAN. This kind of control systems can be effectively used for various users in their houses and offices. An example of the peripheral apparatus is, for example, a printer, a copying machine, a facsimile machine (which may be referred to as "FAX" in the following description), a scanner, a digital camera, a digital video camera, or a multifunction peripheral.

Windows® 7, i.e., an operating system provided by Microsoft Corporation, includes newly introduced functions to manage peripheral apparatuses connected to an information processing apparatus, such as a personal computer (which may be referred to as "PC" in the following description). For example, a "Devices and Printers" folder is a window that displays apparatuses connected to the PC. Device Stage™ has a link function capable of displaying a link to a unique application or service provided by each peripheral apparatus. The "Device Stage" is a trademark of Microsoft Corporation.

A "Devices and Printers" folder screen (see FIG. 5A) can be displayed when it is selected on a "start menu" screen of the Windows®. Further, a Device Stage™ screen (see FIG. 5B) of each peripheral apparatus can be opened when it is selected from the "Devices and Printers" folder. The Device Stage™ can provide a visual screen that enables each user to easily access a function or service relating to the apparatus.

For example, when the peripheral apparatus is a printer, a list of print standby documents and a printer property screen can be displayed on the Device Stage™ screen. In this case, users can launch a print queue and the printer property screen via the Device Stage™ screen to confirm information of the peripheral apparatus (printer).

There are various online services available via the Internet for information processing apparatuses and peripheral apparatuses, due to the growth of the Internet. For example, if the Device Stage™ screen provides a link to a support site on the Internet that is provided by a manufacturer of an apparatus, users can easily access an intended site relating to their apparatuses.

The content of the Device Stage™ is meta data, which is exclusively constituted by a resource file (e.g., XML format file, image file, and icon file). Thus, it is feasible to customize view contents and functions of the Device Stage™ of each peripheral apparatus by customizing the meta data (i.e., XML file, image file, and icon file) for each peripheral apparatus.

Operational controls of the apparatus are described in the above-described XML file. The XML file is a static text file. Therefore, the XML file cannot include any functions and variables, which are generally packaged in a general program (software). However, variables that can be used in the above-described XML file are prepared for some information supported by the OS.

For example, variables for a printer driver name (friendly name) allocated to a printer queue and variables for a WIA driver name allocated to a scanner function WIA driver using the WIA can be provided by the OS.

Further, it is feasible to control the processing based on a path of a registry and information (content) having been set in the registry, and an architecture of the processor. However, it is unfeasible to control the processing based on an attribute value of a printer class driver. In the present exemplary embodiment, the Device Stage™ may be referred to as a device management screen.

It is now assumed that an example of the peripheral apparatus is a multifunction printer (which may be referred to as "MFP" in the following description). The MFP is functionally operable as a printer, a facsimile machine, and a scanner. The MFP includes a storage device. When a user performs an operation relating to a printer class driver in an environment in which a Windows® OS preceding the Windows® 7 is installed on a PC that is connected to an MFP or a printer (i.e., a device), it is common that the user performs the operation according to the following procedure.

(1-1) The user launches the control panel on the start menu of the Windows®.

(1-2) The user launches a specific control panel for the printer class driver.

(1-3) The user selects an icon associated with a desired printer class driver, and performs the operation. For example, if one device is associated with a plurality of printer class drivers, a plurality of icons are displayed for respective printer class drivers. Therefore, the user can select an icon of a desired printer class driver and perform the operation.

For example, according to a conventional technique discussed in Japanese Patent Application Laid-Open No. 2005-85132, if a user performs an operation relating to a printer class driver via the Device Stage™ in an environment in which a device associated with a plurality of printer class drivers is connected to the PC, a user is required to perform an operation differently. The Device Stage™ cannot identify each printer class driver based on its attribute. Therefore, the user performs the operation according to the following procedure.

(2-1) The user opens the "Devices and Printers" folder.

(2-2) The user selects an operation target device in the "Devices and Printers" folder.

(2-3) The user opens a Device Stage™ screen dedicated to the device. Thus, a task for performing an operation relating to a printer class driver (i.e., a button to be pressed to execute a function) can be displayed (as described below with reference to FIG. 5C).

(2-4) The user executes the above-described task on the Device Stage™ screen.

(2-5) The user selects a target printer class driver.

For example, it is now assumed that a user performs an operation relating to an arbitrary printer class driver in a case where an MFP associated with a printer driver and a FAX driver (i.e., printer class drivers) is connected to a single PC. In this case, the user performs the operation without specifying a target printer class driver in the above-described steps (2-1) to (2-4).

Subsequently, in step (2-5), a list of printer class drivers associated with the MFP is displayed (as described below with reference to FIG. 5D). The user is requested to select a target printer class driver in the displayed list. Therefore, user operability deteriorates compared to the conventional example in which users can perform a sequential operation for each target printer class driver.

The content to be displayed on the Device Stage™ and display conditions thereof are described in a device management control file. It is feasible to allocate a task to each printer class driver referring to the driver name. However, in this case, if a different driver name is given to an updated driver, the task allocated to the driver does not function any more. Further, if numerous driver names are described in the device management control file, it will take a long time to complete the display of the Device Stage™.

SUMMARY OF THE INVENTION

The present invention is directed to a peripheral apparatus control system that can provide a device management screen capable of providing appropriate view contents and functions according to the use environment of each user to provide excellent operability. When a user performs an operation relating to a printer class driver, the peripheral apparatus control system according to the present invention enables the user to perform the operation without deteriorating the user operability.

According to an aspect of the present invention, an information processing apparatus includes a driver capable of controlling a peripheral apparatus that has unique information. The information processing apparatus includes a management unit configured to manage the peripheral apparatus and display a peripheral apparatus management screen, wherein the management unit is configured to acquire an attribute of the driver and determine a view content of the peripheral apparatus management screen according to the acquired attribute of the driver.

The present invention brings the following effects.
(1) It is feasible to realize a peripheral apparatus control system that can provide a device management screen capable of providing appropriate view contents and functions according to the use environment of each user to provide excellent operability.
(2) Even in a case where a single peripheral device is associated with a plurality of printer class drivers, it is feasible to perform processing for an arbitrary printer class driver on the device management screen. Thus, the user operability can be improved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates a content of a device management control file.

FIGS. 13A and 13B are flowcharts illustrating an example of printer class driver attribute acquisition processing according to an exemplary embodiment of the present invention.

FIG. 15 illustrates a PRINTER_INFO_2 structure.

DESCRIPTION OF THE EMBODIMENTS

Various exemplary embodiments, features, and aspects of the invention will be described in detail below with reference to the drawings.

Hereinafter, the description relating to the Windows® 7 Operating System is based on the information opened to the public, as of Sep. 15, 2010, on the Internet site (http://msdn-.microsoft.com/en-us/library/default.aspx) of Microsoft Developer Network (MSDN), and therefore its detailed description is not repeated in the following exemplary embodiments.

Further, in the context of the following description, the term "USB" represents Universal Serial Bus. The description relating to the "USB" is based on the information opened to the public, as of Sep. 15, 2010, on the Internet site (http://www.usb.org/home) of Universal Serial Bus and therefore its detailed description is not repeated in the following exemplary embodiments.

Further, in the context of the following description, the term "WSD" represents Web Services on Devices. The description relating to the "WSD" is based on the information opened to the public, as of Sep. 15, 2010, on the Internet site (http://www.microsoft.com/whdc/connect/rally/rallywsd.mspx) of Windows® Hardware Developer Central, and therefore its detailed description is not repeated in the following exemplary embodiments.

Figure 1:
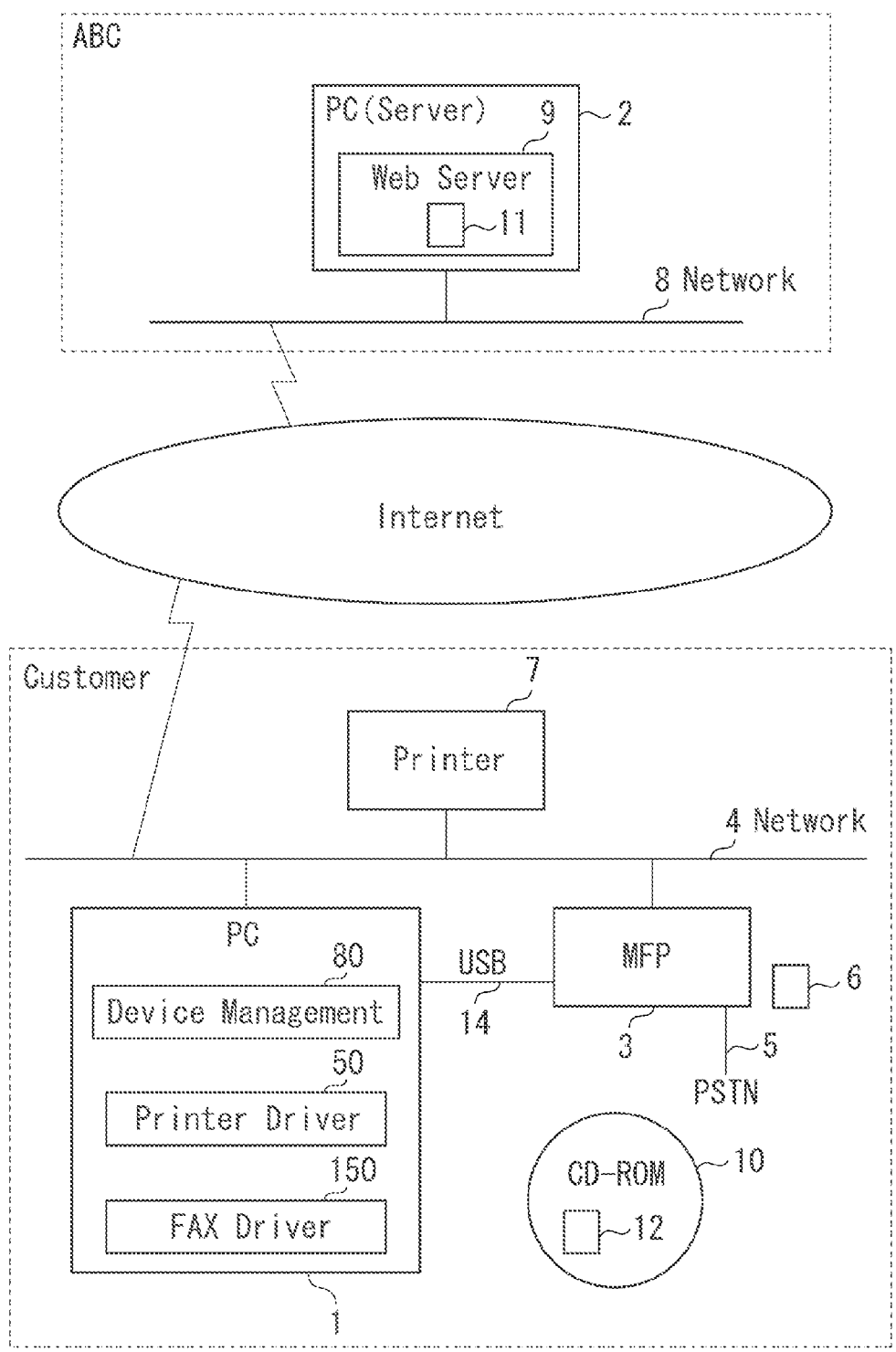
FIG. 1 is a block diagram illustrating an example configuration of a peripheral apparatus control system that includes an information processing apparatus and a peripheral apparatus according to an exemplary embodiment of the present invention.
Figure 2A:
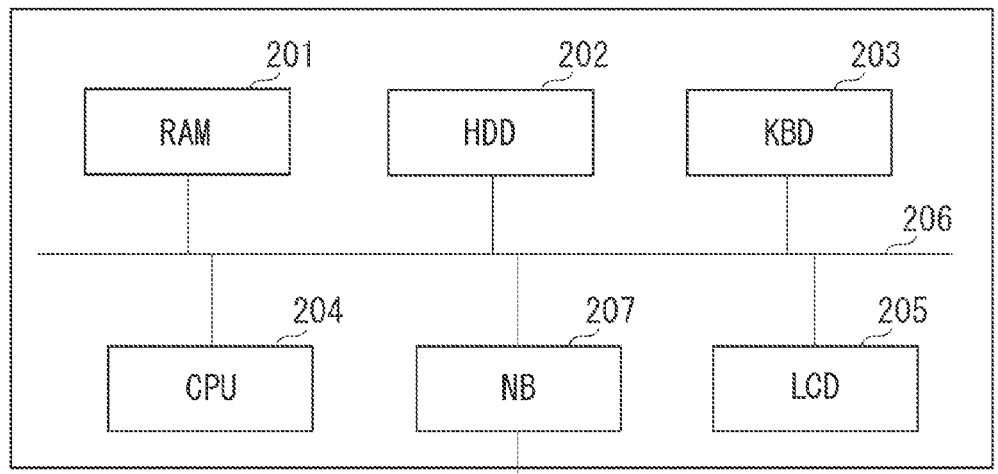
FIGS. 2A and 2B are block diagrams illustrating an example hardware configuration of a PC and an MFP according to an exemplary embodiment of the present invention.

FIG. 1 is a block diagram illustrating an example configuration of a peripheral apparatus control system that includes an information processing apparatus and a peripheral apparatus according to an exemplary embodiment of the present invention. The peripheral apparatus control system illustrated in FIG. 1 includes two information processing apparatuses (which may be referred to as "PC 1" and "PC 2" in the following description). Each information processing apparatus can be constituted by a general personal computer (which may be referred to as "PC" in the following description). FIG. 2A illustrates an example of a hardware configuration of the PC 1 or the PC 2. The Microsoft Corporation operating system Windows® 7 or a comparable operating system (which may be referred to as "OS" in the following description) is installed on each PC. The PC 1 and the PC 2 are connected to Ethernet® networks 4 and 8, respectively.

A multifunction printer (hereinafter, referred to as "MFP") 3 is an example of a peripheral device according to the present invention, which can be configured by a color inkjet printer, a color facsimile machine, a color scanner, and an external storage for a flash memory. The MFP 3 is functionally operable mainly as a printer and additionally as a facsimile machine and a scanner.

The peripheral apparatus according to the present invention is, for example, a printer, a copying machine, a facsimile machine, a scanner, a digital camera, or a multi-function peripheral having similar functions. The MFP 3 has a hardware configuration illustrated in FIG. 2B. The MFP 3 is connected to the PC 1 via the USB interface 14 or the network 4 to perform bidirectional communications.

The PC 1 includes an application 80, which has a file format (*.EXE) executable by the Windows® system. As an example of the application according to the present invention, the application 80 has the capability of displaying a device management screen (i.e., a peripheral apparatus management screen) illustrated in FIG. 5B. The PC 1 further includes a printer driver 50 illustrated in FIG. 4 and a FAX driver 150 illustrated in FIG. 6.

The network 4 is a home network established in a home of a user (i.e., a client) who uses the MFP 3. The network 8 is an office network established in ABC Corporation. The PC 2 connected to the network 8 includes a web server 9 that is functionally operable as a web server. The web server 9 provides a website of ABC Corporation, which is accessible via the Internet.

A compact disc read only memory (CD-ROM) 10 is a storage medium that can be inserted into a dedicated slot of the PC 1 and can store software (computer programs) and electronic files. The CD-ROM 10 includes a file storing unit 12. The web server 9 of the PC 2 includes a file storing unit 11. A device management control file 800 illustrated in FIG. 8 is stored in and can be distributed from the file storing unit 11 of the web server 9 or the file storing unit 12 of the CD-ROM 10. An analog telephone line 5 is usable when the PC 1 transmits or receives facsimile data via the MFP 3.

A flash memory 6 can be inserted into a flash memory slot (not illustrated) of the MFP 3. The flash memory 6 is a storage that can be referred to by the PC 1.

Figure 2B:
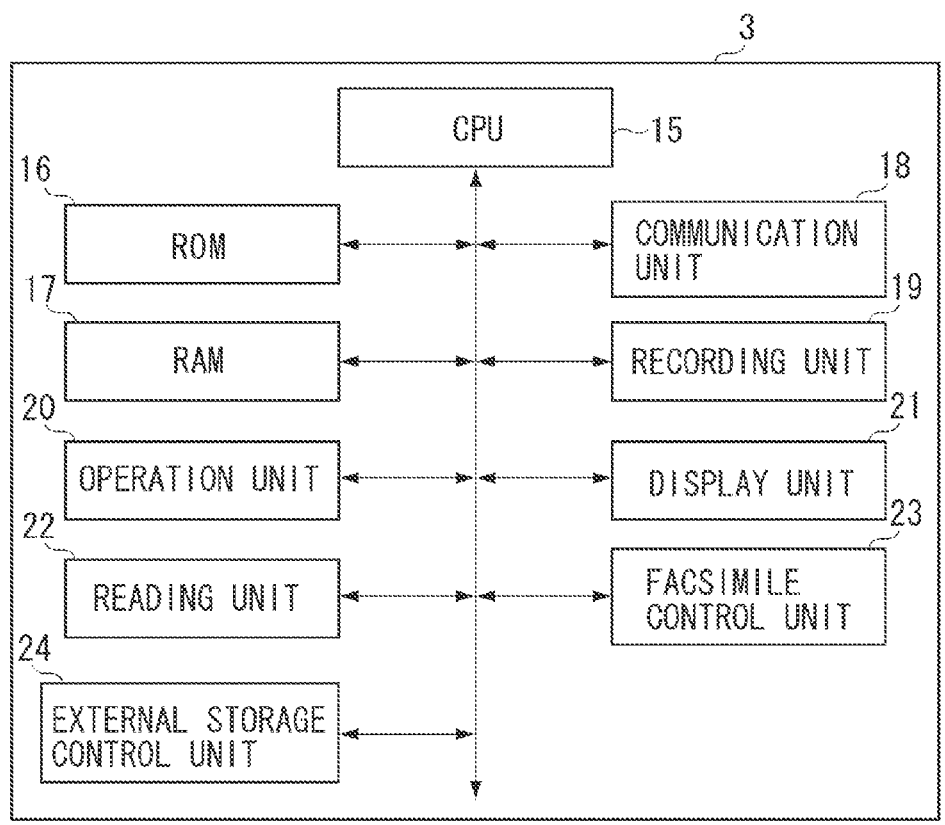

FIGS. 2A and 2B are block diagrams illustrating an example hardware configuration applicable to the PC and the MFP. The PC 1 and the PC 2 have a hardware configuration illustrated in FIG. 2A, although FIG. 2A representatively illustrates a hardware configuration of the PC 1.

As illustrated in FIG. 2A, the PC 1 includes a random access memory (RAM) 201, a hard disk drive (HDD) 202 serving as a storage unit, and a keyboard (KBD) 203 as an example of an input unit. The PC 1 further includes a central processing unit (CPU) 204 serving as a control unit, a liquid crystal display (LCD) 205 as an example of a display unit, and a network board (NB) 207 as an example of a communication control unit. The above-described functional units constituting the PC 1 are mutually connected via a bus 206.

The NB 207 includes a USB port for the USB interface 14. The storage unit can be a portable CD-ROM or a built-in ROM, which can realize functions of various applications (e.g., a device management 80 and a print application 30) and modules (software programs) illustrated in FIG. 3, FIG. 4, FIG. 6, and FIG. 14.

The MFP 3 has a hardware configuration illustrated in FIG. 2B. The MFP 3 illustrated in FIG. 2B includes a central processing unit (CPU) 15 constituted by a microprocessor. The CPU 15 is functionally operable according to a program stored in a read only memory (ROM) 16 to control a RAM 17, a communication unit 18, a recording unit 19, an operation unit 20, a display unit 21, a reading unit 22, a facsimile control unit 23, and an external storage control unit 24.

The ROM 16 stores a software program relating to the control of the printer driver 50 (see FIG. 4), which causes the MFP 3 to perform recording (printing) processing and also perform processing for notifying the PC 1 of a printing operation state. Further, the ROM 16 stores a software program relating to the control of the FAX driver (see FIG. 6), which causes the MFP 3 to perform facsimile transmission or reception processing and also perform processing for notifying the PC 1 of a facsimile transmission or reception state.

The ROM 16 further stores a software program relating to the control of a scanner driver (not illustrated), which causes the MFP 3 to perform image reading processing and also perform processing for notifying the PC 1 of a reading operation state.

The RAM 17 temporarily stores print data to be printed by the recording unit 19, which is mainly transmitted from the PC 1. Further, the RAM 17 temporarily stores image data read by the reading unit 22, facsimile transmission data transmitted from the PC 1, and facsimile reception data received by the facsimile control unit 23.

The communication unit 18 includes connection ports dedicated to the USB interface 14 and the network 4, and a connection port dedicated to the analog telephone line 5. The communication unit 18 can control USB, Ethernet®, and facsimile analog communications. The recording unit 19 includes a printing unit and an electric circuit. The printing unit includes an inkjet type recording head, color inks, a carriage, and a recording sheet conveying mechanism. For example, the electric circuit of the recording unit 19 is an ASIC that can generate print pulses to be supplied to the above-described recording head based on the above-described print data.

When a user performs a printing operation or a facsimile transmission operation via an application installed on the PC 1, the view content (image data) of an opened file is temporarily stored, as an EMF format spool file, in the HDD 202 of the PC 1. Then, the spool file is converted via the printer driver 50 or the FAX driver 150 into print data or facsimile transmission data including commands to control the MFP 3. Then, the converted data of the spool file is transmitted to the MFP 3 via the USB interface 14 or the network 4.

The recording unit 19 can generate print pulses converted from the print data received by the MFP 3 and perform printing on a recording sheet based on the generated print pulses. The facsimile control unit 23 converts the facsimile transmission data received by the MFP 3 into facsimile communication protocols, and transmits the facsimile communication protocols to a destination facsimile apparatus via the analog telephone line 5. The operation unit 20 has various buttons (e.g., a power source button and a reset button) to enable users to operate the MFP 3.

The display unit 21 includes a touch panel and a liquid crystal display (LCD) to display a state of the MFP 3 and enable users to input and display various settings and telephone numbers. The reading unit 22 is constituted by a color image sensor and an electric circuit constituted by an image processing ASIC. The reading unit 22 can control a scanner function of the MFP 3.

The facsimile control unit 23 is constituted by a facsimile modem and an analog communication circuit. The facsimile control unit 23 can control facsimile transmission and reception according to the facsimile communication protocols. The external storage control unit 24 is constituted by a flash memory attachment slot and a storage interface circuit, and can control an attached flash memory.

Figure 3:
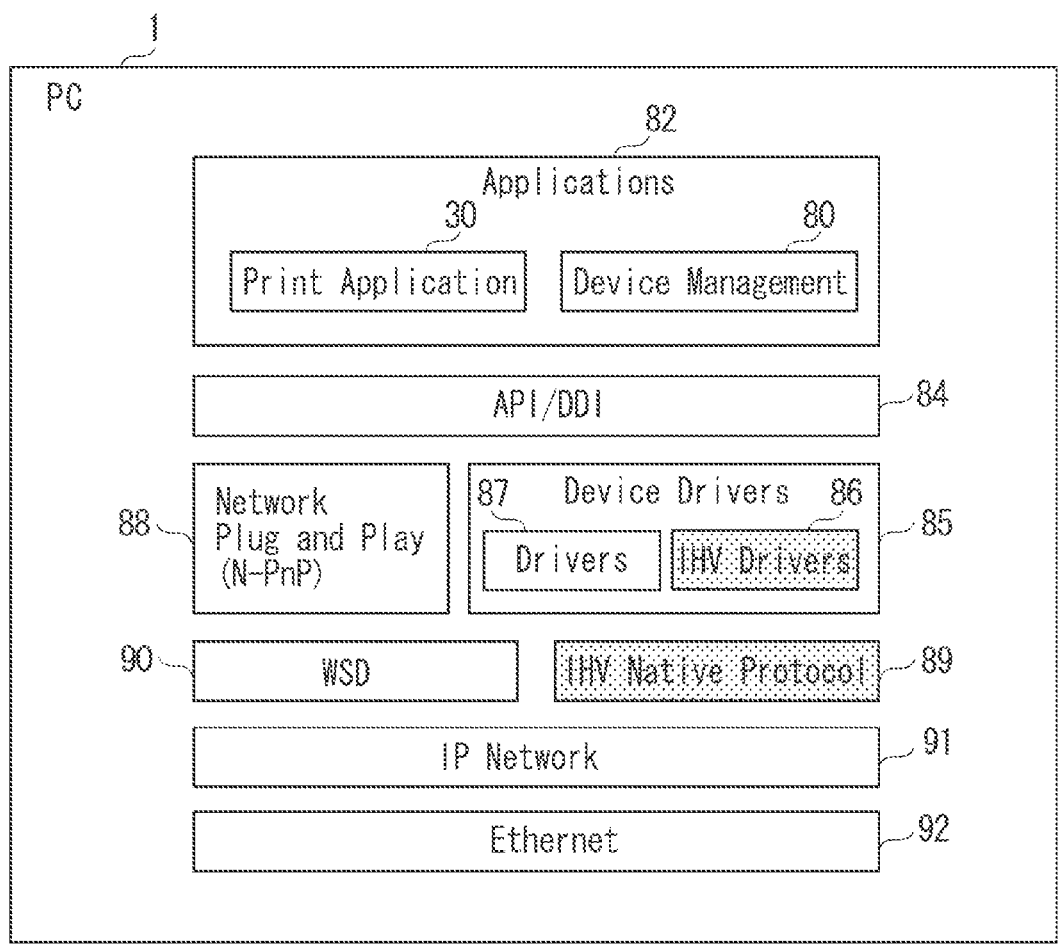
FIG. 3 is a block diagram illustrating a software configuration of the PC according to an exemplary embodiment of the present invention.

FIG. 3 illustrates a software configuration of the PC. The PC 1 illustrated in FIG. 3 includes an Ethernet® control stack 92 that can control the Ethernet®, and an IP Network control stack 91 that can control the IP Network. The PC 1 further includes a WSD control stack 90 that can control the WSD, an Independent Hardware Vendor (IHV) native protocol control stack 89 that can control protocols of IHV, and a network Plug and Play (N-PnP) control stack 88 that can control the N-PnP.

Plug and Play Extensions (PnP-X), which can support a network connected device, is packaged as a standard function in the Windows® 7 OS. The PnP-X is one of extension functions for the Plug and Play. In the present exemplary embodiment, the above-described N-PnP can be used as a function comparable to the Plug and Play Extensions (PnP-X).

The PC 1 further includes a device driver group 85, an application/DDI interface 84, and an application group 82. The device driver group 85 includes a standard driver group 87 packaged as standard drivers of the OS and an IHV driver group 86 provided by the IHV. The application/DDI interface 84 includes an Application Programming Interface (API) and a Device Driver Interface (DDI). The application group 82 includes an application (Device Management) 80, which is packaged as a standard application of the OS. The application group 82 further includes the print application 30 described below with reference to FIG. 4.

Figure 5A:
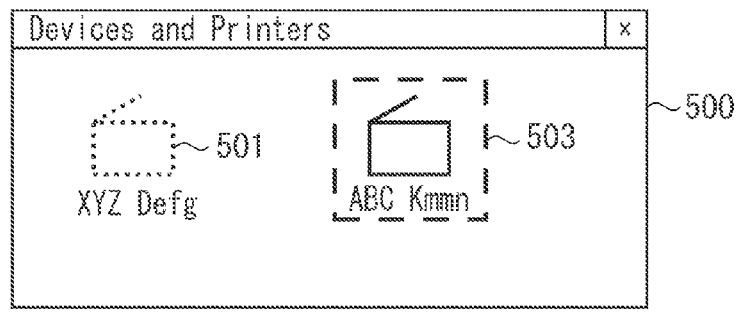
FIGS. 5A to 5D illustrates a "Devices and Printers" folder and a device management screen.
Figure 5B:
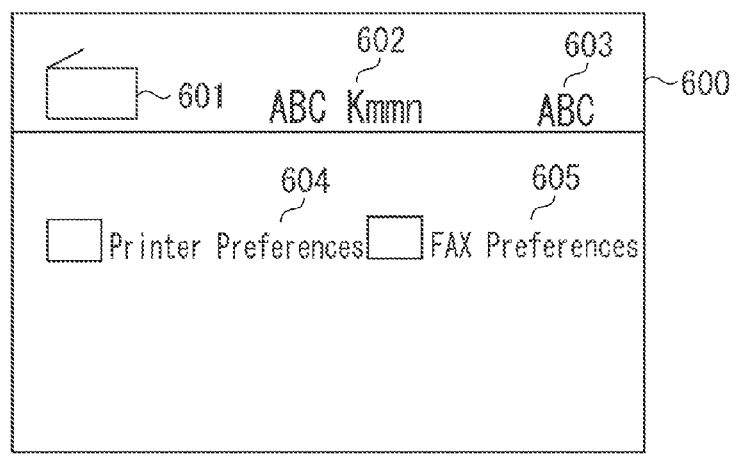

The device management 80 can manage, execute, and display a "Devices and Printers" folder 500 illustrated in FIG. 5A and a device management screen 600 illustrated in FIG. 5B via an application/DDI interface 84.

Figure 4:
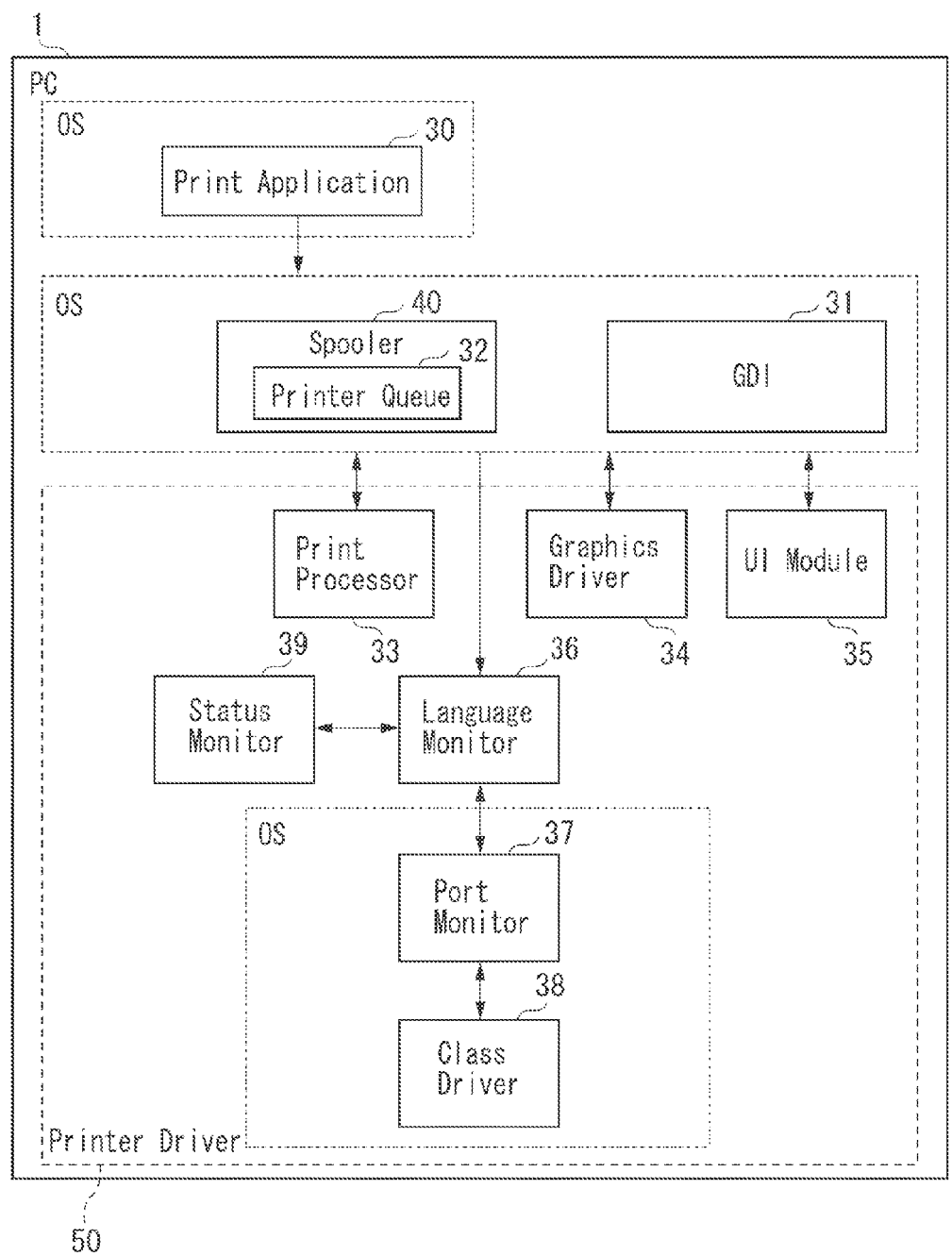
FIG. 4 is a block diagram illustrating an example configuration of a printer driver of the PC.

FIG. 4 illustrates an example configuration of the printer driver of the PC. The printer driver illustrated in FIG. 4 is the printer driver 50 installed on the PC 1 and dedicated to the MFP 3. The printer driver 50 includes a plurality of modules (i.e., a print processor 33, a graphics driver 34, a UI module 35, a language monitor 36, and a status monitor 39).

The print application 30 is, for example, Notepad (Notepad.exe), which is packaged as a standard text editor of the OS. A Graphic Device Interface (GDI) 31 is a part of the OS. A print queue 32 is provided, as a part of a spooler 40, for queuing of a print job.

The print processor 33 can change a print layout and perform special processing on an image to be printed. The graphics driver 34 performs printer driver image processing as a core function of the image processing to be performed by the print driver. More specifically, the graphics driver 34 can process an image to be printed based on a drawing command received from the GDI 31, and can generate a print control command. The UI module 35 can provide and control a user interface of the printer driver.

The language monitor 36 is functionally operable as a data communication interface that can control data transmission/reception. The status monitor 39 can display an operational state (e.g., residual ink amount, warning, and error of the MFP 3). A port monitor 37 can transmit data, if received from the language monitor 36, to an appropriate port. Further, the port monitor 37 can receive data from the MFP 3 via a class driver 38.

The class driver 38 is a low-level module closest to the port. In the present exemplary embodiment, the class driver 38 corresponds to a driver for a unique protocol (WSD or IHV) printer class, which controls the port (e.g., the USB or network port in the present exemplary invention). The printer driver 50 is provided by ABC Corporation (i.e., the manufacturer of the MFP 3).

Figure 6:
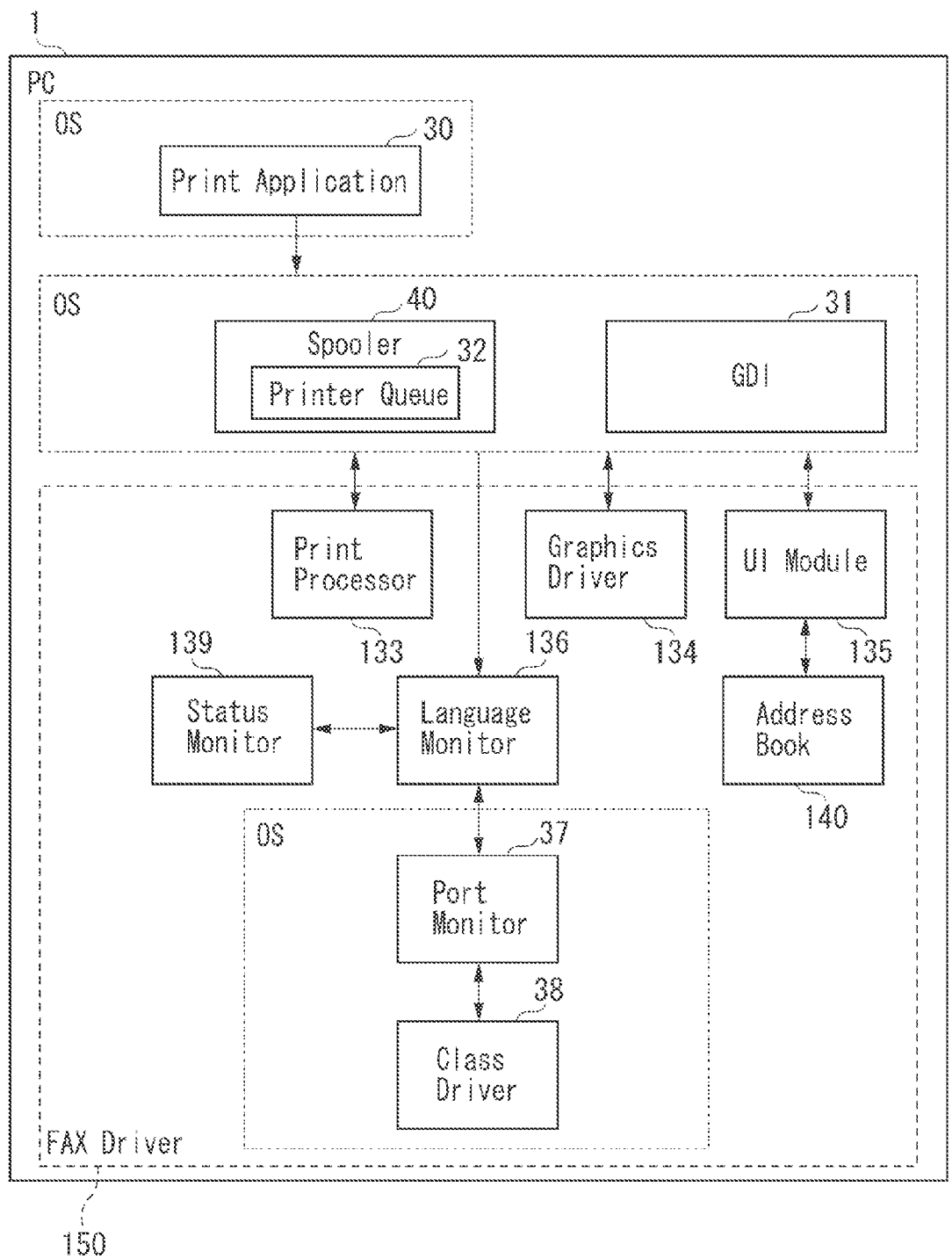
FIG. 6 is a block diagram illustrating an example configuration of a FAX driver of the PC according to an exemplary embodiment of the present invention.

FIG. 6 illustrates an example configuration of the FAX driver of the PC. The FAX driver illustrated in FIG. 6 corresponds to a printer class driver. A facsimile transmission job is handled as a print job in the OS. Therefore, in the following description, the facsimile transmission job may be referred to as a print job.

The FAX driver illustrated in FIG. 6 is the FAX driver 150 installed on the PC 1 and dedicated to the MFP 3. The FAX driver 150 includes a plurality of modules (i.e., a print processor 133, a graphics driver 134, a UI module 135, a language monitor 136, and a status monitor 139). The print application 30 is, for example, Notepad (Notepad.exe), which is packaged as a standard text editor of the OS. A Graphics Device Interface (GDI) 31 is a part of the OS.

A printer queue 32 is provided, as a part of the spooler 40, for queuing of a print job (i.e., a facsimile transmission job). The print processor 133 can change a layout of a facsimile transmitted image and perform special processing on an image to be facsimile transmitted. The graphics driver 134, as a core function of the image processing to be performed by the FAX driver, performs facsimile transmission image processing. More specifically, the graphics driver 134 can process an image to be facsimile transmitted based on a drawing command received from the GDI 31, and can generate a facsimile transmission control command.

The UI module 135 can provide and control a user interface of the FAX driver. The language monitor 136 is functionally operable as a data communication I/F that can control data transmission/reception. The status monitor 139 can display an operational state (e.g., result of facsimile transmission and warning/error of the MFP 3). An address book 140 can centrally manage registration and change of facsimile transmission destination information (e.g., name, FAX number, etc.).

The port monitor 37 can transmit data, if received from the language monitor 136, to an appropriate port. Further, the port monitor 37 can receive data from the MFP 3 via the class driver 38.

The class driver 38 is a low-level module closest to the port. In the present exemplary embodiment, the class driver 38 corresponds to a driver for a unique protocol (WSD or IHV) printer class, which controls the port (e.g., the USB or network port in the present exemplary invention). The FAX driver 150 is provided by ABC Corporation (i.e., the manufacturer of the MFP 3).

Figure 7A:
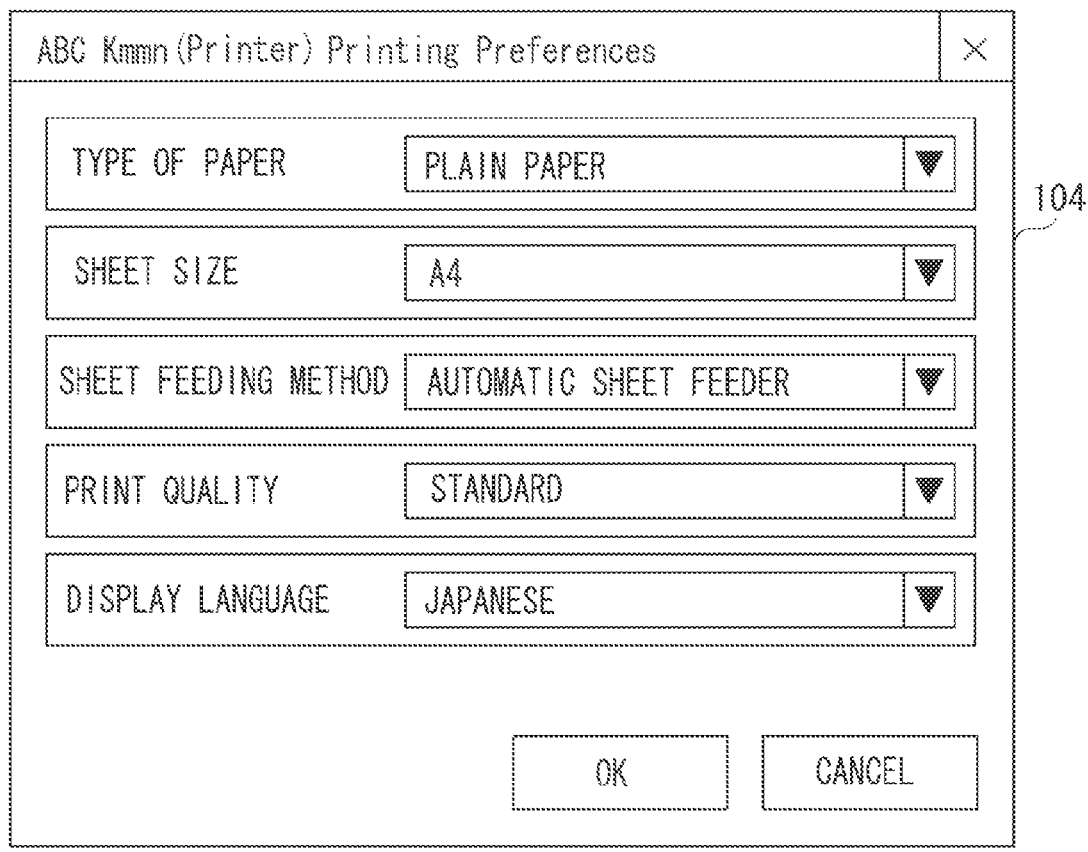
FIGS. 7A and 7B illustrate example print setting screens for the printer driver and the FAX driver.

FIG. 7A illustrates an example print setting dialog of the printer driver 50. A print setting dialog 104 illustrated in FIG. 7A enables users to select each operation portion on the dialog, and perform each setting required for printing to be performed by the MFP 3.

Figure 7B:
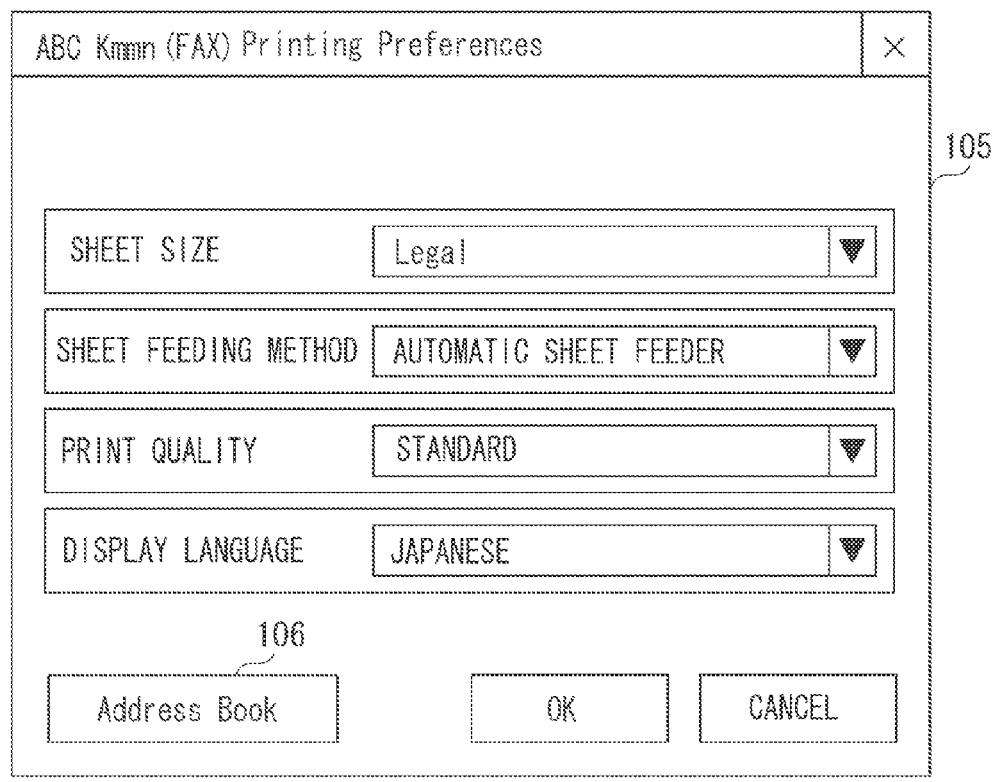

FIG. 7B illustrates an example print setting dialog of the FAX driver 150. As illustrated in FIG. 6, the FAX driver corresponds to a printer class driver. Therefore, the facsimile transmission setting user interface is generally referred to as a print setting dialog.

A print setting dialog 105 illustrated in FIG. 7B enables users to select each operation portion on the dialog, and perform each setting required for facsimile transmission to be performed by the MFP 3. An address book 106 enables users to register and manage the information relating to each facsimile transmission destination.

FIGS. 5A to 5D illustrate examples of the "Devices and Printers" folder and the device management screen. The "Devices and Printers" folder 500 illustrated in FIG. 5A can be displayed on the PC 1. A printer or a facsimile machine, if it is currently usable by the PC 1, is displayed for each driver in the folder 500. In the present exemplary embodiment, a device 501 named as "XYZ Defg" and a device 503 named as "ABC Kmmn" are displayed as available devices.

In the "Devices and Printers" folder 500, the device 501 is in an unusable state because the line type of an icon representing the device 501 is a dotted line. On the other hand, the device 503 is in a usable state because the line type of an icon representing the device 503 is a solid line.

The device management screen 600 illustrated in FIG. 5B can be launched and displayed in response to a selection of the device 503 in the "Devices and Printers" folder 500 illustrated in FIG. 5A.

The device management screen 600 can be used to manage the MFP 3. Items displayed at an upper part of the device management screen 600 are a device icon 601, a device name 602, and a manufacturer information 603. Data of the device icon 601 is stored as a part of a device management control file storing unit 905 (not illustrated).

Further, information displayed in the field of the device name 602 is the device name of the device 503 stored in the "Devices and Printers" folder 500. Further, information displayed in the field of the manufacturer information 603 is a character string designated in a <dm:manufacturer> element 801 illustrated in FIG. 8. Items displayed at a lower part of the device management screen 600 are links to functions relating to the device 503.

More specifically, a printer setting button 604 and a FAX setting button 605 are displayed in the lower part of the device management screen 600. As illustrated in FIG. 8, a <dm:functions> element 803 includes two <dm:function> elements 804 and 810 indicating button and function information.

Figure 5C:
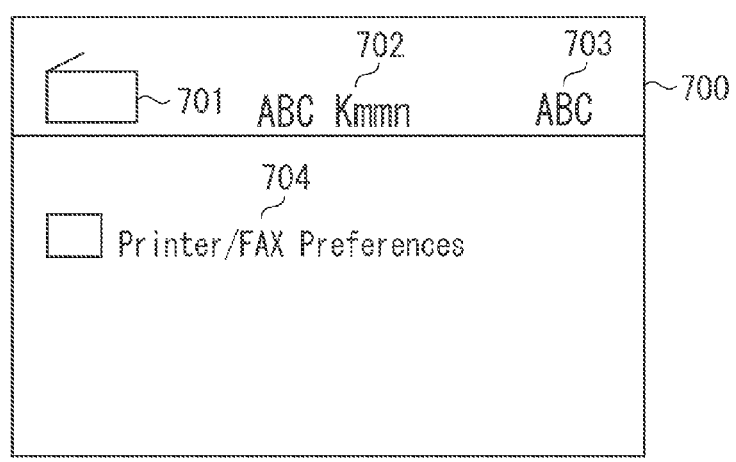

A device management screen 700 illustrated in FIG. 5C can be launched and displayed in response to a selection of the device 503 in the "Devices and Printers" folder 500 illustrated in FIG. 5A. The device management screen 700 can be used to manage the MFP 3. Items displayed at an upper part of the device management screen 700 are a device icon 701, a device name 702, and manufacturer information 703. Data of the device icon 701 is stored as a part of the device management control file storing unit 905 (not illustrated).

Further, information displayed in the field of the device name 702 is a device name of the device 503 of the "Devices and Printers" folder 500. Further, information displayed in the field of the manufacturer information 703 is character string designated in the <dm:manufacturer> element 801 illustrated in FIG. 8. An item displayed at a lower part of the device management screen 700 is a link to a function related to the device 503. More specifically, a printer/FAX setting button 704 is displayed at the lower part of the device management screen 700. The <dm:functions> element 803 illustrated in FIG. 8 includes a <dm:function> element 816 indicating button and function information.

Figure 5D:
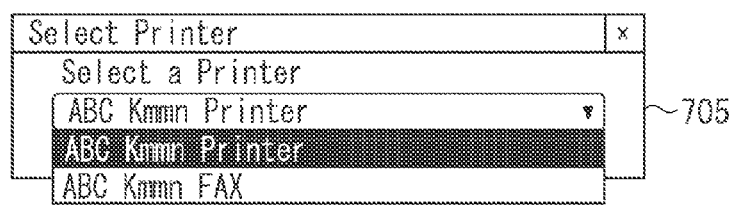

A printer selection screen 705 illustrated in FIG. 5D can be launched and displayed in response to a selection of the printer/FAX setting button 704 illustrated in FIG. 5C. The printer selection screen 705 enables users to select an operation target printer class driver. If there is only one printer class driver associated with the device, the printer selection screen 705 is not displayed.

FIG. 8 illustrates an example content of the device management control file 800. The device management control file 800 is an English version. The information illustrated in FIG. 8 is stored in the file storing unit 11 or 12.

In FIG. 8, information set in the <dm:manufacturer> element 801 is the name of ABC Corporation, which is the manufacturer of the device (i.e., the MFP 3). Information set in a <dm:model> element 802 is Kmmn, which is the model name of the device (i.e., the MFP 3). The information set in the elements 801 and 802 can be used when the device management control file 800 is installed.

Further, the device management control file 800 includes information required to constitute the device management screen 600. To display the printer setting button 604 and the FAX setting button 605 illustrated in FIG. 5B on the device management screen 600 to be launched and displayed when the MFP 3 is connected to the PC 1, the <dm:function> elements 804, 810, and 816 indicating button and function information respectively are set in the <dm:functions> element 803.

In the <dm:function> element 804, a character string "Printer Preferences" to be displayed on the printer setting button 604 is set in a <dm:name xml:lang="en-US">Printer Preferences</dm:name> element 805. Further, information indicating a condition to be satisfied to display the printer setting button 604 is set in a <dm:required> element 806.

A <dm:device>printer</dm:device> element 807 indicates that a device connected to the PC 1 via the USB interface 14 or the network 4 can use the printer class driver 50 or 150 to realize a printer function or a FAX function.

A <dm:attributeFAX>false</dm:attributeFAX> element 808 indicates that the device connected to the PC 1 via the USB interface 14 or the network 4 is associated with a printer class driver that does not include any FAX attribute. More specifically, the condition to be indicated by the <dm:required> element 806 is that the printing utilizing a printer class driver that does not include any FAX attribute is feasible. Information indicating a printer print setting launching function is set in a <dm:execute>openPrinterPreferences</dm:execute> element 809.

In the <dm:function> element 810, information set in a <dm:name xml:lang="en-US">FAX Preferences</dm:name> element 811 is a character string "FAX Management" to be displayed on the FAX setting button 605.

Information set in a <dm:required> element 812 is a condition to be satisfied to display the FAX setting button 605. Information set in a <dm:device>printer</dm:device> element 813 indicates that the device connected to the PC 1 via the USB interface 14 or the network 4 can use the printer class driver 50 or 150 to realize the printer function or the FAX function.

Information set in a <dm:attributeFAX>true</dm:attributeFAX> element 814 indicates that the device connected to the PC 1 via the USB interface 14 or the network 4 is associated with a printer class driver whose attribute is FAX. More specifically, the condition indicated by the <dm:required> element 812 is that the printing utilizing a printer class driver that does not include any FAX attribute is feasible.

Information set in a <dm:execute>openFAXPreferences</dm:execute> element 815 indicates a function capable of launching FAX print settings.

In the <dm:function> element 816, information set in the <dm:name xml:lang="en-US">FAX Preferences</dm:name> element 811 is a character string "Printer/FAX Preferences" to be displayed on the printer/FAX setting button 704.

Information set in a <dm:required> element 818 is a condition to be satisfied to display the printer/FAX setting button 704. Information set in a <dm:device>printer</dm:device> element 819 indicates that the device connected to the PC 1 via the USB interface 14 or the network 4 can use the printer class driver 50 or 150 to realize the printer function or the FAX function.

Information set in a <dm:attributeFAX invert="true"/> element 820 indicates that the device connected to the PC 1 via the USB interface 14 or the network 4 is associated with a printer class driver whose attribute is unknown. More specifically, the condition to be indicated by the <dm:required> element 818 is that the printing utilizing an unknown printer class driver that does not include any FAX attribute is feasible.

Information set in a <dm:execute>openPrinterFAXPreferences</dm:execute> element 821 indicates a function capable of launching printer/FAX setting. In a case where the device is associated with a plurality of printer class drivers, if the printer/FAX setting is launched, the printer selection screen 705 illustrated in FIG. 5D can be displayed to enable users to select a target printer class driver. If the device is associated with only one printer class driver, a setting screen dedicated to the printer class driver can be displayed.

If operation buttons of printer class drivers are displayed in respective attributes on the device management screen 600 with reference to the attributes of respective printer class drivers, a user can select a desired operation button by designating a desired printer class driver. Thus, the user operability can be improved.

Figure 14:
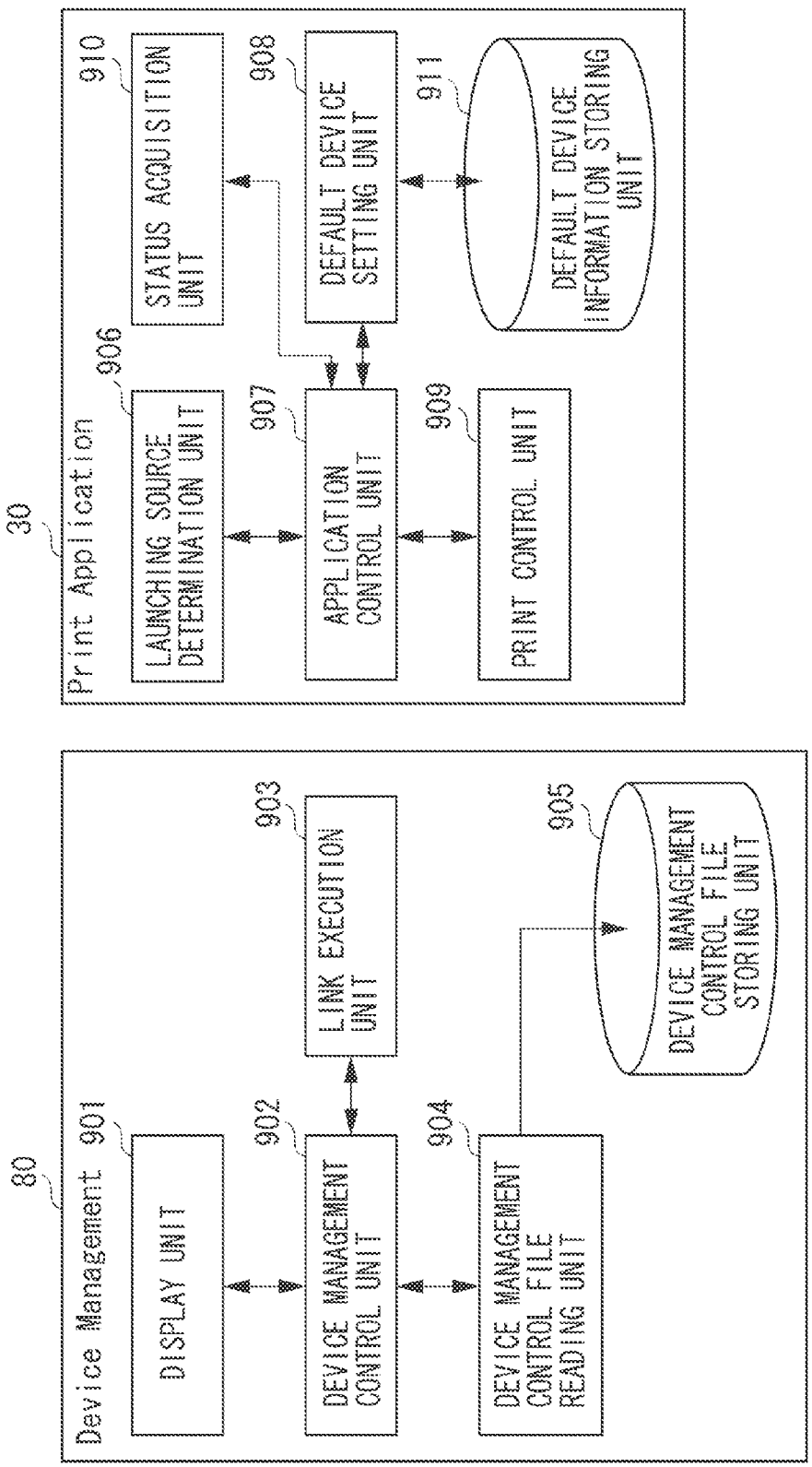
FIG. 14 is a block diagram illustrating an example software configuration of a device management and a Print application according to an exemplary embodiment of the present invention.

FIG. 14 illustrates an example software configuration of the device management and the Print application. In FIG. 14, the device management 80 includes a display unit 901, a device management control unit 902, a link execution unit 903, a device management control file reading unit 904, and the device management control file storing unit 905. The device management control file 800 stored in step S1405 illustrated in FIG. 10 can be stored in the device management control file storing unit 905.

The print application 30 includes a launching source determination unit 906, an application control unit 907, a default device setting unit 908, a print control unit 909, a status acquisition unit 910, and a default device information storing unit 911.

The device management screen 600 can be launched and displayed when the MFP 3 is connected to the PC 1 via the USB interface 14 or the network 4. The device management screen 600 can be launched and displayed in response to a selection of a device in the "Devices and Printers" folder 500 illustrated in FIG. 5A. In the following description, it is assumed that the device management screen 600 illustrated in FIG. 5B is launched and displayed when the MFP 3 is connected to the PC 1 via the USB interface 14 or the network 4.

Figure 9:
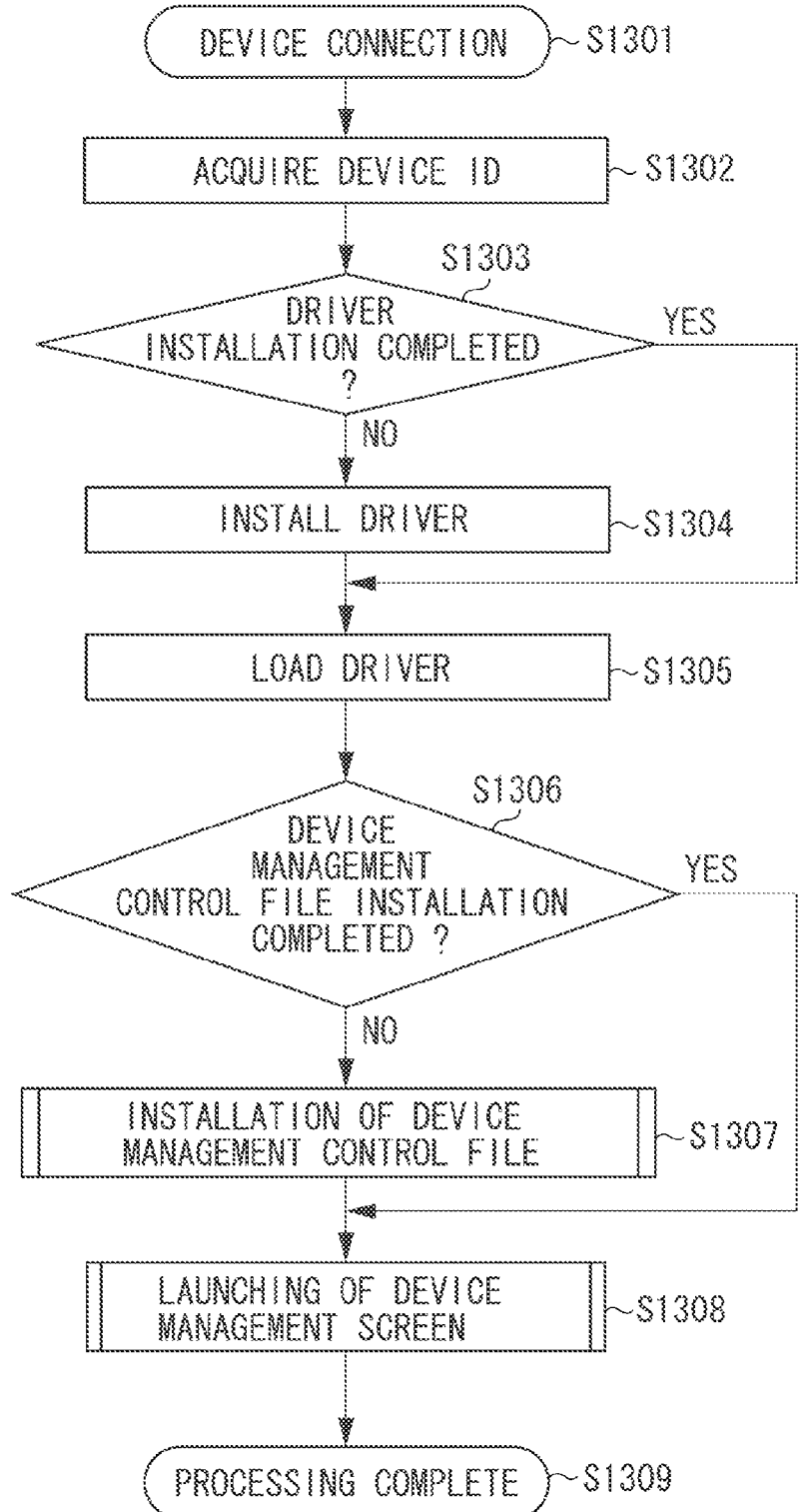
FIG. 9 is a flowchart illustrating an example of device connection processing according to an exemplary embodiment of the present invention.

FIG. 9 is a flowchart illustrating an example of device connection processing. A software program relating to the flowchart illustrated in FIG. 9 is stored in the HDD 202 and can be executed by the CPU 204 when it is loaded into the RAM 201. In step S1301 illustrated in FIG. 9, if the device (i.e., the MFP 3) is connected to the PC (i.e., the PC 1) via the USB interface 14 or the network 4, then in step S1302, the PC 1 acquires a device ID.

The device ID can be expressed, for example, using a character string "MFG:ABC;MDL:Kmmn;CLS:PRINTER; CMD:P4;DES:ABC Kmmn;ATR:PRN." The following information is a device ID relating to the printer function of the MFP 3, which the PC 1 can acquire from the MFP 3 via the USB interface 14 or the network 4.

Manufacturer (MFG:): ABC
Model (MDL:): Kmmn
Class (CLS:): PRINTER
Command (CMD:): P4 (ABC Corporation private print control command)
Description (DES:): ABC Kmmn
Attribute (ATR:): RRN Next, in step S1303, the device management 80 determines whether the drivers (e.g., the printer driver 50, the FAX driver 150, and the scanner driver (not illustrated)) is already installed on the PC 1. If it is determined that the driver is not installed on the PC 1 (NO in step S1303), then in step S1304, the OS installs the drivers (the printer driver 50, the FAX driver 150, the scanner driver).

Subsequently, in step S1305, the OS loads the drivers (i.e., the printer driver 50, the FAX driver 150, and the scanner driver). If the loading of the drivers (i.e., the printer driver 50, the FAX driver 150, and the scanner driver) is completed, the device (i.e., the MFP 3) can be registered in the "Devices and Printers" folder 500 illustrated in FIG. 5A.

In step S1306, the device management 80 determines whether the device management control file 800 illustrated in FIG. 8 is already installed on the PC 1. The device management 80 can perform the processing of step S1306 by checking if the installed device management control file matches with the drivers (the printer driver 50, the FAX driver 150, scanner driver) based on manufacturer (MFG:) and model (MDL:) information included in the device ID.

Figure 10:
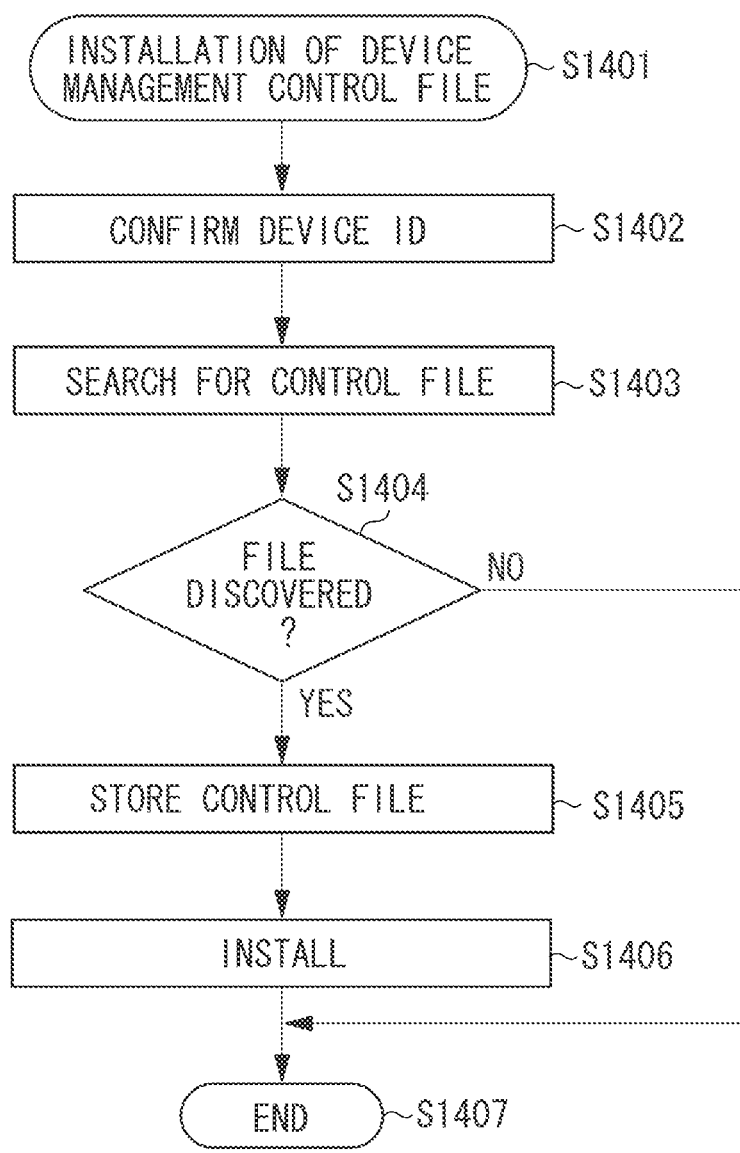
FIG. 10 is a flowchart illustrating an example of device management control file installation processing according to an exemplary embodiment of the present invention.

If it is determined that the device management control file 800 is not yet installed (NO in step S1306), then in step S1307, the device management 80 executes control file installation processing illustrated in FIG. 10. Then, in step S1308, the device management 80 executes device management screen launching processing illustrated in FIG. 11. Then, in step S1309, the device management 80 terminates the device connection processing of the flowchart illustrated in FIG. 9.

If it is determined that the device management control file 800 is already installed (YES in step S1306), the processing proceeds to step S1308. If it is determined that the drivers (i.e., the printer driver 50, the FAX driver 150, and the scanner driver) are already installed (YES in step S1303), the processing proceeds to step S1305.

FIG. 10 is a flowchart illustrating an example of device management control file installation processing. A software program relating to the flowchart illustrated in FIG. 10 is stored in the HDD 202, and can be executed by the CPU 204 when it is loaded into the RAM 201.

If the device management 80 executes the device management control file installation processing in step S1307 illustrated in FIG. 9, then in step S1401 illustrated in FIG. 10, the device management 80 starts device management installation processing.

Further, in step S1402, the device management 80 confirms a device ID of the device (i.e., the MFP 3) connected via the USB interface 14 or the network 4. In step S1403, the device management 80 searches for the device management control file 800 dedicated to the device (i.e., the MFP 3) connected to the PC 1 based on the manufacturer (MFG:) and model (MDL:) information included in the device ID.

In the device management control file 800 illustrated in FIG. 8, the manufacturer (MFG:) "ABC" and the model (MDL:) "Kmmn" corresponding to the device (i.e., the MFP 3) are described in the <dm:manufacturer> element 801 and the <dm:model> element 802. The device management 80 searches for the device management control file 800 dedicated to the device (i.e., the MFP 3) in the file storing unit 11 provided in the web server 9, or in the file storing unit 12 of the CD-ROM 10 inserted in the PC 1, based on the information described in the element 801 and the element 802.

In step S1404, the device management 80 determines whether the device control file 800 has been acquired from the file storing unit 11 or 12. If it is determined that the device management control file 800 has been acquired (YES in step S1404), then in step S1405, the device management 80 stores the device management control file 800 in a predetermined portion in the HDD 202 of the PC 1. Further, in step S1406, the device management 80 installs the device management control file 800.

If the installation of the device management control file 800 is completed, then in step S1407, the device management 80 terminates the device management control file installation processing. In the present exemplary embodiment, it is assumed that the device management control file 800 corresponding to the device (i.e., the MFP 3) has been detected and installed. If it is determined that the device management control file 800 has not been acquired (NO in step S1404), the device management 80 does not install the device management control file 800 and then, in step S1407, terminates the device management control file installation processing.

Figure 11:
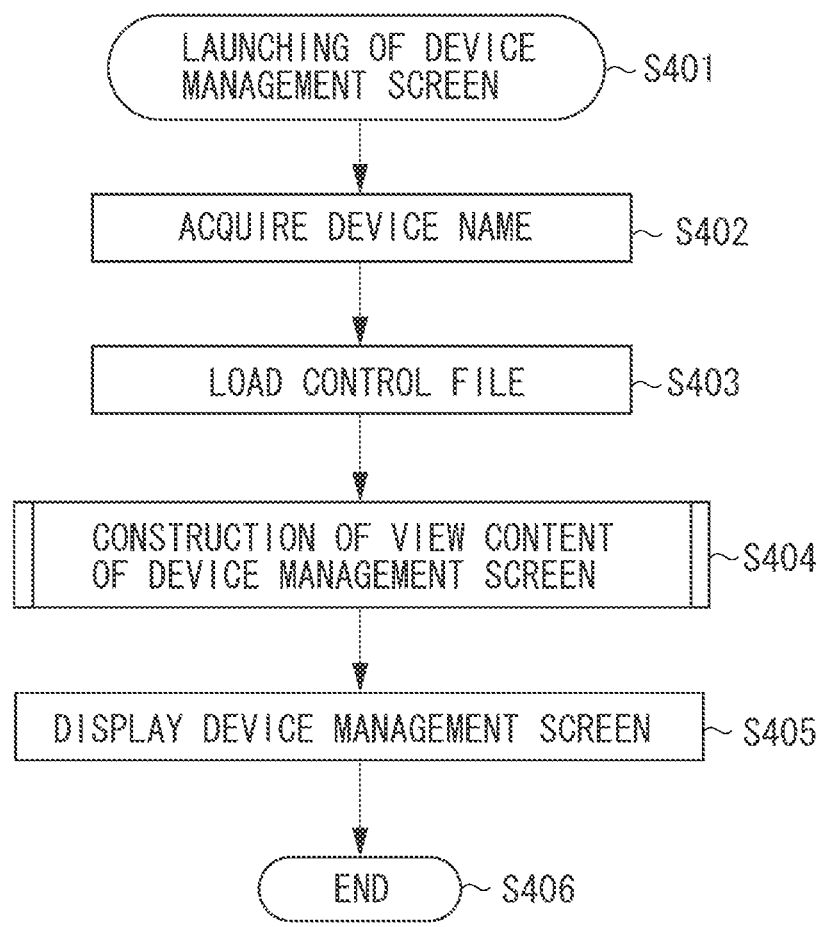
FIG. 11 is a flowchart illustrating an example of device management screen launching processing according to an exemplary embodiment of the present invention.

FIG. 11 is a flowchart illustrating an example of the device management screen launching processing. A software program relating to the flowchart illustrated in FIG. 11 is stored in the HDD 202, and can be executed by the CPU 204 when it is loaded into the RAM 201.

If the device management 80 executes the device management screen launching processing in step S1308 illustrated in FIG. 9, or when a user selects the device 503 from the "Devices and Printers" folder 500, then in step S401 illustrated in FIG. 11, the device management 80 starts the device management screen launching processing.

In step S402, the device management control unit 902 acquires a device name selected from the "Devices and Printers" folder 500. In the present exemplary embodiment, the device 503 is selected. Therefore, the device name "ABC Kmmn" is acquired. In step S403, the device management control file reading unit 904 loads the device management control file 800 illustrated in FIG. 8, which has been stored in step S1405 illustrated in FIG. 10, based on the acquired device name. In step S404, the device management control unit 902 executes device management screen view content constructing processing illustrated in FIG. 12 based on the device management control file 800.

In step S405, the device management control unit 902 causes the display unit 901 to display the device management screen 600 according to the device management screen view content constructed in step S404. Then in step S406, the device management 80 terminates the device management screen launching processing.

Figure 12:
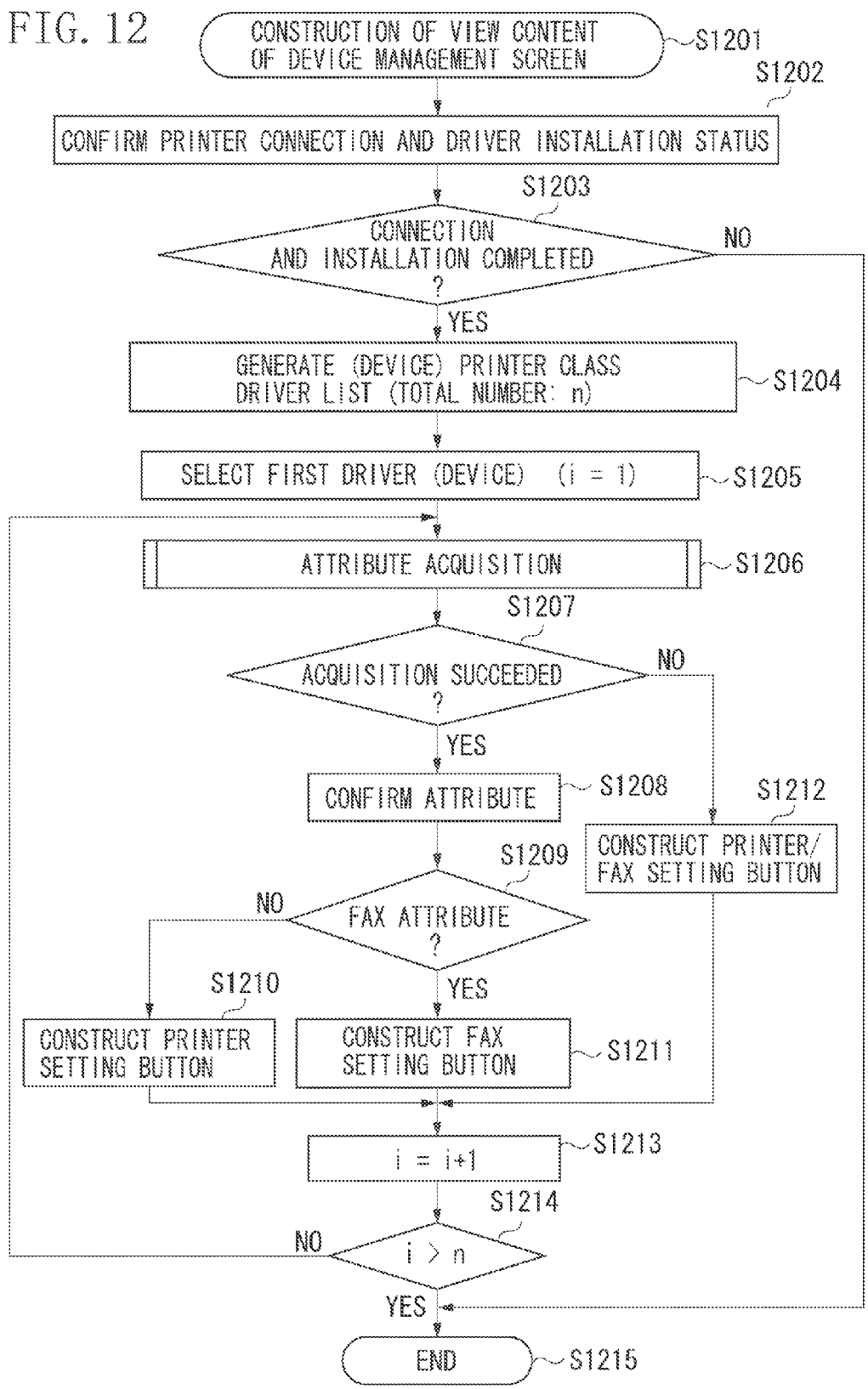
FIG. 12 is a flowchart illustrating an example of device management screen view content constructing processing according to an exemplary embodiment of the present invention.

FIG. 12 is a flowchart illustrating an example of the device management screen view content constructing processing. A software program relating to the flowchart illustrated in FIG. 12 is stored in the HDD 202, and can be executed by the CPU 204 when it is loaded into the RAM 201.

If the device management control unit 902 executes the device management screen view content constructing processing in step S404 illustrated in FIG. 11, then in step S1201 illustrated in FIG. 12, the device management control unit 902 starts the device management screen view content constructing processing.

In step S1202, the device management control unit 902 confirms printer connection and printer class driver installation status with according to the content of the <dm:device> element 807 illustrated in FIG. 8. If the MFP 3 is connected to the PC 1 via the USB interface 14 or the network 4 and the printer class driver associated with the MFP 3 is installed (YES in step S1203), the processing proceeds to step S1204. In other cases (NO in step S1203), the processing proceeds to step S1215.

In step S1204, the device management control unit 902 generates a list of printer class drivers associated with the device (i.e., the MFP 3), and counts the total number "n" of the printer class drivers. In step S1205, the device management control unit 902 selects the first printer class driver (counter i=1) in the list. In step S1206, the device management control unit 902 executes printer class driver attribute acquisition processing illustrated in FIG. 13.

If the printer class driver attribute has been acquired in step S1206 (YES in step S1207), the processing proceeds to step S1208. If the printer class driver attribute has not been acquired in step S1206 (NO in step S1207), the processing proceeds to step S1212.

In step S1212, the device management control unit 902 constructs the printer/FAX setting button 704 according to the content of the <dm:execute> element 821 illustrated in FIG. 8. Then, the processing proceeds to step S1213. If the printer/FAX setting button 704 is executed, the printer selection screen 705 that allows users to select a target printer class driver can be displayed. If the printer/FAX setting button 704 is already constructed at the processing execution timing of step S1212, the device management control unit 902 does not newly construct the printer/FAX setting button 704.

In step S1208, the device management control unit 902 confirms the presence of a FAX attribute with respect to the printer class driver. If the printer class driver does not have any FAX attribute (NO in step S1209), the processing proceeds to step S1210. If the FAX attribute of the printer class driver is present (YES in step S1209), the processing proceeds to step S1211.

In step S1210, the device management control unit 902 constructs the printer setting button 604 according to the content of the <dm:execute> element 809 illustrated in FIG. 8. Then, the processing proceeds to step S1213. In step S1211, the device management control unit 902 constructs the FAX setting button according to the content of the <dm:execute> element 815 illustrated in FIG. 8. Then, the processing proceeds to step S1213. In step S1213, the device management control unit 902 increments the counter value i by one (i.e., i=i+1). Subsequently, in step S1214, the device management control unit 902 compares the counter value i with the total number n of the printer class drivers included in the printer class driver list.

If the counter value i is equal to or less than the total number n of the printer class drivers included in the printer class driver list (NO in step S1214), the device management control unit 902 performs the above-described processing of step S1206 to step S1212 on the i-th printer class driver. If the counter value i is greater than the total number n of the printer class drivers included in the printer class driver list (YES in step S1214), the processing proceeds to step S1215. The device management control unit 902 terminates the device management screen view content constructing processing.

FIGS. 13A and 13B are flowcharts illustrating an example of the printer class driver attribute acquisition processing. A software program relating to the flowchart illustrated in FIG. 13 is stored in the HDD 202, and can be executed by the CPU 204 when it is loaded into the RAM 201.

If the device management control unit 902 executes the printer class driver attribute acquisition processing in step S1206 illustrated in FIG. 12, then in step S1501 illustrated in FIG. 13, the device management control unit 902 starts the printer class driver attribute acquisition processing.

In step S1502, the device management control unit 902 generates a printer information structure. For example, when the OS is Windows® 7, a PRINTER_INFO_2 structure 1000 illustrated in FIG. 15 corresponds to the printer information structure to be generated by the device management control unit 902. In the present exemplary embodiment, the device management control unit 902 processes the PRINTER_INFO_2 structure 1000 as an example of the printer information structure. To this end, the PRINTER_INFO_2 structure 1000 includes a member variable "Attributes" 1001 illustrated in FIG. 15, which represents attributes of the printer class driver.

The printer class driver includes a plurality of attributes and a unique value (unique information) is allocated to each attribute. For a corresponding attribute of the printer class driver, it is feasible to express the attribute of the printer class driver by generating a value combined with a unique value of each attribute and setting the generated value as the Attributes 1001. In the present exemplary embodiment, PRITNER_ATTRIBUTES_FAX is prepared as a unique value representing the FAX attribute.

It is feasible to determine whether the printer class driver is a FAX driver by checking if the value having been set in the Attributes includes a value corresponding to PRINTER_ATTRIBUTE_FAX. In step S1502 illustrated in FIG. 13, the device management control unit 902 prepares the PRINTER_INFO_2 structure 1000 (i.e., the printer information structure).

In step S1503, the device management control unit 902 sends an inquiry about the attribute to the printer class driver based on the PRINTER_INFO_2 structure 1000. If the OS is a Windows®, the device management control unit 902 can inquire about the attribute of a designated printer class driver by calling GetPrinter API with the PRINTER_INFO_2 structure 1000 designated as an argument.

If the printer class driver does not have any FAX attribute, then in step S1504 illustrated in FIG. 13A, the printer class driver does not set a value corresponding to PRINTER_ATTRIBUTE_FAX as Attribute 1001 of the PRINTER_INFO_2 structure 1000. In other words, attribute information to be set in this case indicates that the printer class driver is dedicated to a printer.

If the printer class driver has the FAX attribute, then in step S1604 illustrated in FIG. 13B, the printer class driver sets a value corresponding to PRINTER_ATTRIBUTE_FAX as Attribute 1001 of the PRINTER_INFO_2 structure 1000. In step S1505, the device management control unit 902 stores the PRINTER_INFO_2 structure 1000 acquired from the printer class driver. Then in step S1506, the device management control unit 902 terminates the processing of the flowchart illustrated in FIG. 13.

FIG. 15 illustrates an example content of the PRINTER_INFO_2 structure. The structure illustrated in FIG. 15 includes the member variable "Attributes" 1001, which represents the attribute of the printer class driver.

The first exemplary embodiment includes confirming an attribute of a printer class driver and determining a view content of a device management screen based on the confirmed attribute information. A second exemplary embodiment is different from the first exemplary embodiment in that an object to be confirmed is an attribute of a device.

Figure 16:
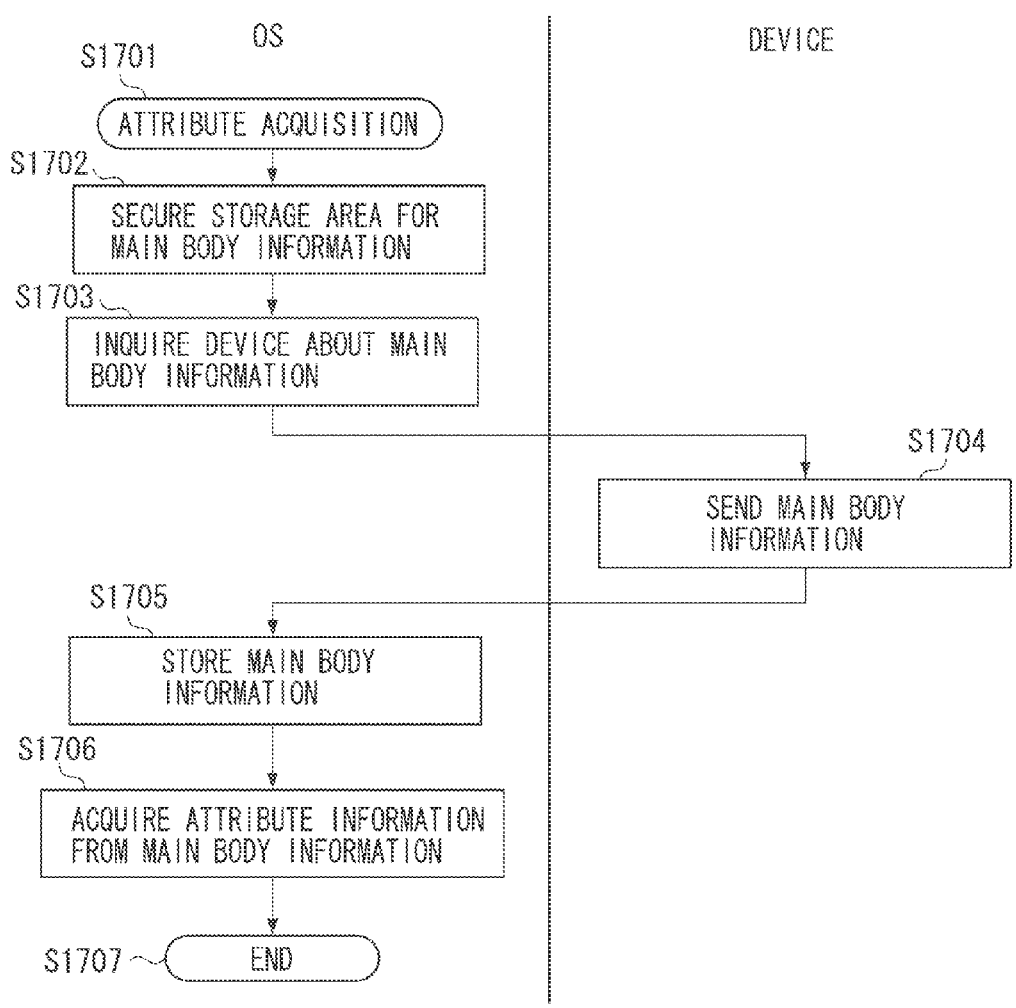
FIG. 16 is a flowchart illustrating printer device attribute acquisition processing according to an exemplary embodiment of the present invention.

FIG. 16 is a flowchart illustrating an example of device attribute acquisition processing, which represents characteristic features of the present exemplary embodiment.

If the device management control unit 902 executes the device management screen view content constructing processing in step S404 illustrated in FIG. 11, then in step S1201 illustrated in FIG. 12, the device management control unit 902 starts the device management screen view content constructing processing.

In step S1202, the device management control unit 902 confirms printer connection and printer class driver installation status according to the content of the <dm:device> element 807 illustrated in FIG. 8. If the MFP 3 is connected to the PC 1 via the USB interface 14 or the network 4 and the printer class driver associated with the MFP 3 is installed (YES in step S1203), the processing proceeds to step S1204. In other cases (NO in step S1203), the processing proceeds to step S1215.

In step S1204, the device management control unit 902 generates a list of devices associated with the MFP 3, and counts the total number "n" of the devices. In the present exemplary embodiment, the PC 1 can recognize the printer function and the FAX function as different devices. In step S1205, the device management control unit 902 selects the first device (counter i=1) in the list. In step S1206, the device management control unit 902 executes printer device attribute acquisition processing illustrated in FIG. 16.

If the printer device attribute has been acquired in step S1206 (YES in step S1207), the processing proceeds to step S1208. If the printer device attribute has not been acquired in step S1206 (NO in step S1207), the processing proceeds to step S1212. In step S1212, the device management control unit 902 constructs the printer/FAX setting button 704 according to the content of the <dm:execute> element 821 illustrated in FIG. 8. Then, the processing proceeds to step S1213.

If the printer/FAX setting button 704 is executed, the printer selection screen 705 that allows users to select a setting target printer class driver can be displayed. If the printer/FAX setting button 704 is already constructed at the processing execution timing of step S1212, the device management control unit 902 does not newly construct the printer/FAX setting button 704.

In step S1208, the device management control unit 902 confirms the presence of the FAX attribute with respect to the device. If the device does not have any FAX attribute (NO in step S1209), the processing proceeds to step S1210. If the FAX attribute of the device is present (YES in step S1209), the processing proceeds to step S1211. In step S1210, the device management control unit 902 constructs the printer setting button 604 according to the content of the <dm:execute> element 809 illustrated in FIG. 8.

In step S1211, the device management control unit 902 constructs the FAX setting button according to the content of the <dm:execute> element 815 illustrated in FIG. 8. Then, in step S1213, the device management control unit 902 increments the counter value i by one (i.e., i=i+1). Subsequently, in step S1214, the device management control unit 902 compares the counter value i with the total number n of the devices included in the device list. If the counter value i is equal to or less than the total number n of the devices included in the device list (NO in step S1214), the device management control unit 902 performs the above-described processing of step S1206 to step S1212 on the i-th device. If the counter value i is greater than the total number n of the printer class drivers included in the device list (YES in step S1214), the processing proceeds to step S1215. The device management control unit 902 terminates the device management screen view content constructing processing.

FIG. 16 is a flowchart illustrating an example of the device attribute acquisition processing. If the device management control unit 902 executes the printer device attribute acquisition processing in step S1206 illustrated in FIG. 12, then in step S1701 illustrated in FIG. 16, the device management control unit 902 starts the device attribute acquisition processing.

In step S1702, the device management control unit 902 secures a storage area for main body information. In the present exemplary embodiment, the device ID is used as the main body information.

The device ID can be expressed, for example, using a character string "MFG:ABC;MDL:Kmmn FAX;CLS:PRINTER;CMD:F4FAX;DES:ABC Kmmn FAX;ATR:FAX", which includes the following information.
Manufacturer (MFG:): ABC
Model (MDL:): Kmmn FAX
Class (CLS:): PRINTER
Command (CMD:): F4FAX (ABC Corporation private FAX control command)
Description (DES:): ABC Kmmn FAX
attribute (ATR:): FAX In step S1703, the device management control unit 902 inquires the device about the device ID. In step S1704, the device sends the device ID. In step S1705, the device management control unit 902 stores the device ID received from the device.

In step S1706, the device management control unit 902 acquires attribute information, which is included in the device ID. According to the above-described example of the device ID, "ATR:FAX;" included in the device ID represents the attribute information of the device. If the device has a FAX attribute, "ATR:FAX;" is included in the device ID. If the device does not have any FAX attribute, the device ID is expressed, for example, using a character string "MFG:ABC;MDL:Kmmn;CLS:PRINTER;CMD:P4;DES:ABC Kmmn;ATR:PRN;" which includes the following information.
Manufacturer (MFG:): ABC
Model (MDL:): Kmmn
Class (CLS:): PRINTER
Command (CMD:): P4 (ABC Corporation private print control command)
Description (DES:): ABC Kmmn
Attribute (ATR:): RRN According to the above-described example of the device ID, "ATR:PRN;" included in the device ID represents the attribute information of the device. If the device does not have any FAX attribute, "ATR:PRN;" is included in the device ID.

If the device management control unit 902 has failed in acquiring attribute information from the printer class driver in the processing of step S1206 illustrated in FIG. 12 according to the first exemplary embodiment, it is useful to acquire attribute information from the device in the processing to be performed in step S1206 illustrated in FIG. 12 according to the second exemplary embodiment. Further, if the device management control unit 902 has failed in acquiring attribute information from the device in the processing of step S1206 illustrated in FIG. 12 according to the second exemplary embodiment, it is useful to acquire attribute information from the printer class driver in the processing to be performed in step S1206 illustrated in FIG. 12 according to the first exemplary embodiment.

Aspects of the present invention can also be realized by a computer (such as a CPU or a micro-processing unit (MPU)) of a system or an apparatus (or a device) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium or a non-transitory computer-readable medium). In such a case, the system or the apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-221799 filed Sep. 30, 2010, which is hereby incorporated by reference herein in its entirety.

What is claimed is:

1. An information processing apparatus providing a device management screen for managing a peripheral apparatus, the information processing apparatus comprising:
a processor and memory;
an acquisition unit configured to acquire unique information representing an output attribute from a printer class driver corresponding to the peripheral apparatus;
a construction unit configured to construct, according to a device management control file, a task based on the acquired unique information; and
a display control unit configured to control to display the device management screen including the constructed task for the printer class driver.

2. An information processing apparatus according to claim 1,
wherein the acquisition unit is configured to acquire, if a printer class driver has been installed in the information processing apparatus, unique information from the installed printer class driver,
wherein the acquisition of unique information is not performed if a printer class driver has not been installed in the information processing apparatus.

3. An information processing apparatus according to claim 1,
wherein the acquisition unit is configured to acquire device identification information including an output attribute from the peripheral apparatus if unique information has not been acquired by the acquisition unit from a printer class driver, and
wherein the construction unit is configured to construct a task corresponding to the output attribute included in the acquired device identification information.

4. An information processing apparatus according to claim 1, wherein the output attribute is a fax attribute.

5. An information processing apparatus according to claim 1, wherein the construction unit is configured to construct a task related to a print function if the acquired unique information does not represent a fax attribute as the output attribute.

6. An information processing apparatus according to claim 1, wherein the acquisition unit, the construction unit and the display control unit are providing as an operating system installed in the information processing apparatus.

7. A method for controlling an information processing apparatus which includes a processor and memory, the information processing apparatus further configured to provide a device management screen for managing a peripheral apparatus, the method comprising:

acquiring unique information representing an output attribute from a printer class driver corresponding to the peripheral apparatus;

constructing, according to a device management control file, a task based on the acquired unique information; and displaying the device management screen including the constructed task for the printer class driver.

8. The method according to claim 7,
wherein the acquiring includes acquiring, if a printer class driver has been installed in the information processing apparatus, unique information from the installed printer class driver, and
wherein the acquiring of unique information is not performed if a printer class driver has not been installed in the information processing apparatus.

9. The method according to claim 7,
wherein the acquiring includes acquiring device identification information including an output attribute from the peripheral apparatus if unique information has not been acquired from a printer class driver, and
wherein the constructing includes constructing a task corresponding to the output attribute included in the acquired device identification information.

10. The method according to claim 7, wherein the output attribute is a fax attribute.

11. The method according to claim 7, wherein the constructing includes constructing a task related to a print function if the acquired unique information does not represent a fax attribute as the output attribute.

12. A non-transitory computer readable storage medium containing computer-executable instructions for controlling an information processing apparatus which includes a processor and memory, the information processing apparatus further configured to provide a device management screen for managing a peripheral apparatus, the computer-executable instructions when executed by the processor perform the following steps:

acquiring unique information representing an output attribute from a printer class driver corresponding to the peripheral apparatus;

constructing, according to a device management control file, a task based on the acquired unique information; and displaying the device management screen including the constructed task for the printer class driver.

13. The computer readable storage medium according to claim 12,
wherein the acquiring includes acquiring, if a printer class driver has been installed in the information processing apparatus, unique information from the installed printer class driver, and
wherein the acquiring of unique information is not performed if a printer class driver has not been installed in the information processing apparatus.

14. The computer readable storage medium according to claim 12,
wherein the acquiring includes acquiring device identification information including an output attribute from the peripheral apparatus if unique information has not been acquired from a printer class driver, and
wherein the constructing includes constructing a task corresponding to the output attribute included in the acquired device identification information.

15. The computer readable storage medium according to claim 12, wherein the output attribute is a fax attribute.

16. The computer readable storage medium according to claim 12, wherein the constructing includes constructing a task related to a print function if the acquired unique information does not represent a fax attribute as the output attribute.

17. The computer readable storage medium according to claim 12, wherein computer-executable instructions that perform the acquiring, constructing and displaying steps are provided as an operating system installed in the information processing apparatus.

* * * * *